(12) United States Patent
Papandriopoulos et al.

(10) Patent No.: US 7,864,697 B2
(45) Date of Patent: Jan. 4, 2011

(54) ADAPTED METHOD FOR SPECTRUM MANAGEMENT OF DIGITAL COMMUNICATION SYSTEMS

(76) Inventors: John Papandriopoulos, 205-211 Grattan St., Parkville, Victoria (AU) 3052; Jamie Scott Evans, 205-211 Grattan St., Parkville, Victoria (AU) 3052

( * ) Notice: Subject to any disclaimer, the term of this patent is extended or adjusted under 35 U.S.C. 154(b) by 391 days.

(21) Appl. No.: 11/890,144

(22) Filed: Aug. 3, 2007

(65) Prior Publication Data
US 2009/0034554 A1 Feb. 5, 2009

(51) Int. Cl.
*H04L 12/26* (2006.01)

(52) U.S. Cl. .................. 370/252; 370/468; 375/252

(58) Field of Classification Search ................ 370/201, 370/252, 253, 468; 375/252, 254, 130, 240–241, 375/260; 703/18–22, 2
See application file for complete search history.

(56) References Cited

U.S. PATENT DOCUMENTS

| | | | | |
|---|---|---|---|---|
| 6,885,746 B2 * | 4/2005 | Hausman et al. | ............ | 379/417 |
| 7,158,563 B2 * | 1/2007 | Ginis et al. | ................. | 375/224 |
| 7,274,734 B2 * | 9/2007 | Tsatsanis | .................... | 375/222 |
| 7,302,379 B2 * | 11/2007 | Cioffi et al. | ................... | 703/20 |
| 7,394,752 B2 * | 7/2008 | Hasegawa et al. | ........... | 370/201 |
| 7,551,544 B2 * | 6/2009 | Laakso et al. | ............... | 370/201 |
| 2007/0274404 A1 * | 11/2007 | Papandriopoulos et al. | . | 375/260 |
| 2007/0280334 A1 * | 12/2007 | Lv et al. | .................... | 375/133 |

* cited by examiner

*Primary Examiner*—Ricky Ngo
*Assistant Examiner*—Gary Mui
(74) *Attorney, Agent, or Firm*—The Halvorson Law Firm

(57) ABSTRACT

Provided is a method of determining a spectrum management of digital communication systems having a plurality of communication lines by determination of the power levels within each band, for each user, assuming a predetermined maximum interference from other users. The spectral management center has a power allocation determinator for receiving a modelled power level and a noise weight from each user communication line and is able to determine allocated power of its respective communication line based on the optimised determined power needs of the plurality of communication lines of the digital communication systems. In one form the calculations are undertaken in the SMC. In another form the master is undertaken in the SMC while the slave is undertaken at the user's modem and the power level of an individual communication line and its interference by adjacent lines is determined at the user's modem and communicated to the spectral management center.

20 Claims, 9 Drawing Sheets

Rate-regions associated with two users, one from each user-group.

Comparison of PSDs arising from SCALE, SCAPE and IWF (downstream).

Comparison of PSDs arising from SCALE, SCAPE and IWF (upstream).

ADAPTED METHOD FOR SPECTRUM MANAGEMENT OF DIGITAL COMMUNICATION SYSTEMS

RELATED APPLICATION

The present application is related to co-pending application Ser. No. 11/433,025, filed 12 May 2006, the disclosure of which is incorporated by reference in its entirety.

FIELD OF THE INVENTION

The present invention relates to a method and system for improving digital communications systems. More specifically, the invention relates to dynamically determining operational parameters that affect performance in communication systems such as Digital Subscriber Line (DSL) systems. Still more particularly it relates to a method for distributed spectrum management of digital communication systems.

BACKGROUND ART

Digital subscriber line (DSL) technology can use the existing copper twisted pair networks used in the analog telephone network. The copper wiring is said to form communication lines or loops. At spaced ends of the communication lines are located transceivers (for example, modems) or other transmitters and receivers for respectively sending and receiving digital signals communicated along the loops.

Twisted pairs are typically bundled together in a common physical sheath, known as a binder; all twisted pairs within a bundle are said to belong to a certain binder group. Within such a binder group, these twisted pair lines are sufficiently close such that electromagnetic radiation from one pair can induce "crosstalk" interference into one or more other pairs. Therefore a signal sent along a communication line and received by a modem can comprise the transmitted signal and one or more interference signals from adjacent communication lines. In turn, these crosstalk signals forms spurious noise that interferes with intended transmissions. In general, crosstalk effects in addition to long loop lengths are the main obstacles to reaching higher data rates in such copper-based networks.

Near end crosstalk (NEXT) is caused by transmitters interfering with receivers on the same side of the bundle and is often avoided by using non-overlapping transmit and receive spectra (frequency division duplex; FDD) or disjoint time intervals (time division duplex; TDD).

Far end crosstalk (FEXT) is caused by transmitters on opposite sides of the bundle. In some cases this interference can be 10 to 20 decibel larger than the background noise and has been identified by some as the dominant source of performance degradation in DSL systems.

Telephone companies are increasingly shortening the loop using remote terminal (RT) deployments, resulting in lower signal attenuation and larger available bandwidths. Unfortunately this can cause other problems such as the "near far" effect due to the crosstalk. Common in code-division multiple access (CDMA) wireless systems, the near-far effect occurs when a user enjoying a good channel close to the receiver overpowers the received signal of a user further away having a worse channel and where both users transmit at the same power levels.

One of the shortcomings of current multi-user communication systems is power control. In typical communication systems, interference limits each user's performance. Further the power allocation of each communication line depends not only on its own loop characteristics, but also on the power allocation of all other communication lines as exemplified by the near-far effect described above. Therefore the digital communications system design should not treat each user independently, but rather consider the power allocation of all communication lines jointly.

Dynamic spectrum management (DSM) has the potential to dramatically improve the performance of digital subscriber line (DSL) networks well-beyond the current status quo, and not surprisingly, looks to be a key fixture of all future-generation DSL standards. Its focus is on relieving the problems caused by crosstalk, brought on by the close proximity of twisted copper pairs that are packed into distribution binders of 25-100 lines on their way to the exchange. While long loop lengths certainly inhibit performance, the crosstalk problem has been recognized as the critical impairment with, for example, interference contributions of 10-20 dB over the background noise.

Two competing paradigms for addressing the crosstalk phenomena are known: vectoring and spectrum balancing. Vectoring treats the DSL network as a multiple-input multiple-output (MIMO) system, where modems co-ordinate at the signal level to effectively remove crosstalk through successive decoding or preceding.

DSM techniques are not just limited to the networks of the future. Iterative water-filling (IWF) has proved to be an attractive method for optimizing power spectral densities (PSDs) of loops without centralized co-ordination.

In contrast, spectrum balancing involves a much looser level of coordination. Modems employ a low-complexity single-user encoding and decoding strategy while treating interference as noise. Early static spectrum management (SSM) efforts attempted to define static spectra of various DSL services, in an attempt to limit the crosstalk interference between DSLs that may be deployed in the same binder. The notion of DSM goes further by allowing loops to dynamically negotiate a spectrum allocation that effectively avoids crosstalk, thereby enabling significant improvements in overall network performance.

Early work in the area of DSM introduced an iterative water-filling (IWF) scheme to balance user power spectrum densities (PSDs), where each user repeatedly measured the interference received from other users, and then determined their own power allocation according to a water-filling distribution without regard for the subsequent impact on other users. This process results in a fully distributed algorithm with a reasonable computational complexity.

More recent efforts have focused on the underlying optimization problem that spectrum balancing aims to solve. Unfortunately this optimization is a difficult nonconvex problem. As such, the Optimal Spectrum Balancing (OSB) algorithm makes use of a grid-search to find the optimal power allocation to a predetermined quantization of user powers. It suffers from an exponential complexity in the number of users, and so near-optimal Iterative Spectrum Balancing (ISB) algorithms were developed that reduce complexity through a series of line-searches, avoiding the grid-search bottleneck. Both of these algorithms are centralized and are not well-suited for practical implementation.

Unfortunately, many have shown that IWF can be far from optimal. The performance gap therein lies with the damage one user's power allocation has on the performance of others: IWF does not explicitly take such information into account.

It is an object of the invention to alleviate at least in part one or more of the problems of the prior art or at least provide an alternative approach. More particularly, embodiments of the

SUMMARY OF THE INVENTION

The invention provides a method of determining a spectrum management of a digital communication systems having a plurality of communication lines on which signals are transmitted and received with interference by respective users by determination of the power levels within each band, for each user, assuming a predetermined maximum interference from other users.

In a first broad aspect, the invention provides a method of determining a spectrum management of a digital communication system having a plurality of communication lines on which signals are transmitted and received with interference by respective users, the method comprising the steps of:

a. determining a model of a defined digital communication system with each communication line having a predetermined number and width of bands for each user's spectrum;

b. assessing the power levels within each band, for each user, assuming a predetermined maximum interference from other users;

c. undertaking an iterative feedback of assessment of each band of each user to reassess the power levels within each band to a predefined optimised level and modifying the model of the defined digital communication system;

wherein the method provides an output having defined assessed optimised levels for each band of at least a portion of the communication lines of the defined digital communication system.

According to another aspect, the invention provides a method for spectrum management of a digital communication systems having a plurality of communication lines on which signals are transmitted and received by respective users, the method comprising the steps of:

1. receiving information about line, signal and interference characteristics of a plurality of the communication lines from a plurality of sources;

2. determining each user's power spectrum categorised into a number of bands;

3. determining constraints on power allocation of particular plurality of the communication lines for each band of each user's power spectrum by:

a. determining a model based on a predetermined number and width of bands for each user's spectrum;

b. assessing the power levels within each band, for each user, assuming a predetermined maximum interference from other users; and c. undertaking an iterative feedback of each band of each user to reassess the power levels within each band to a predefined optimised level;

4. placing constraints on power allocation of particular plurality of the communication lines between respective transmitter and receiver taking into consideration the determined line, signal and interference characteristics of a plurality of the communication lines and consideration of the determined constraints on power allocation of the communication lines to allow required effective data-rates for each of said respective users to be satisfied.

According to another aspect, the invention provides a computer readable medium, having executable instructions or software, imbedded or permanently stored that, when executed by a computer or processor of a computer, cause the computer or processor of the computer to perform a method for spectrum management of a digital communication system according to either of the aspects described above.

BRIEF DESCRIPTION OF THE DRAWINGS

In order that the invention is more readily understood embodiments will be described by way of illustration only with reference to the drawings wherein.

LIST OF SYMBOLS, ABBREVIATIONS AND ACRONYMS

Figure 1:
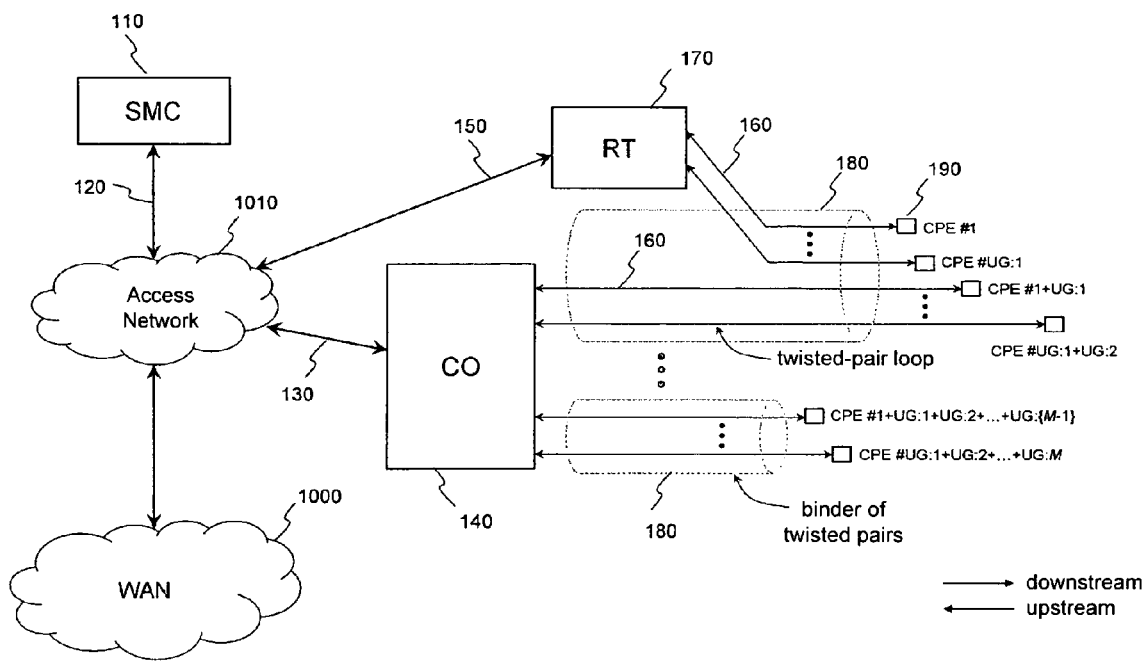
FIG. 1 is a schematic diagram, by way of example, of a digital subscriber line (DSL) communications system utilizing an existing telephone loop plant in connection with a central office (CO) and a number of other loops in connection with a remote terminal (RT); such a system may benefit from the spectrum balancing method according to the environment of a preferred embodiment of the invention.

For ease of reading a summary of abbreviations and acronyms used are listed herein below:

ADSL Asymmetric Digital Subscriber Line
ADSL2 High Speed Asymmetric Digital Subscriber Line
BP Band Preference CDMA Code Division Multiple Access
CO Central Office
CPE Customer Premises Equipment
d.c. Difference of Concave functions
DMT Discrete Multitone
DSL Digital Subscriber Line
DSLAM Digital Signal Line Access Multiplexers
DSM Dynamic Spectrum Management
ESIR Effective SIR
FDD Frequency Division Duplex
FM Fixed Margin
NEXT Near End crossTalk
FEXT Far End crossTalk
HDSL High bit-rate Digital Subscriber Line
ISB Iterative Spectrum Balancing
ISDN Integrated Services Digital Network
IWF Iterative water-filling
KKT Karush-Kuhn-Tucker
LAN Local Area Network
LT Line Termination
MIMO Multiple-input Multiple-Output
NMC Network Management Centre
NP-Hard Non-deterministic Polynomial-time Hard
NT Network Termination
ONU Optical Networking Units
OSB Optimal Spectrum Balancing
PSD Power Spectrum Density
QoS Quality of Service
RA Rate Adaptive
RF Radio frequency
RT Remote Terminal
SCALE Successive Convex Approximation for Low-complExity
SCAWF Successive Convex Approximation for Water Filling
SCAPE Successive Convex Approximation for band-PrefferencE
SIR Signal to Interference plus noise Ratio
SMC Spectrum Management Center
SNR Signal to Noise Ratio
SSM Static Spectrum Management
TDD Time Division Duplex
UG User Group
VDSL Very high bit-rate DSL For ease of reading a summary of symbols and notation used are listed herebelow:

$|A|$=number of elements in the set A
$\emptyset$=the null (empty) set
M=number of bands
K=total number of users in the system
N=total number of DMT tones employed by each user
$P_k^n$=transmit power of user k on tone n
$P_k$=PSD vector for user k
P=the K×N matrix of all user PSDs
c(n)=mapping from tone number n to band number
$L_k^m$=Band level for user k, band 5
$L_k$=Band levels for user k
L=the K×M matrix of all user band levels
$P_k^{req}$=required transmit power of user k
$P_k^{max}$=maximum transmit power of user k
$G_{jk}^n$=channel transfer gain from user k to user j on tone n
$G_{jk}$=N-length vector of channel transfer gains from user k to user j on all tones
$\sigma_k^n$=frequency dependent noise power incident to the receiver of user k on tone n
$\tilde{\sigma}_k^n$=total interference plus noise power incident to the receiver of user k on tone n
$b_k^n$=bit loading of user k on tone n
$SIR_k^n$=signal to interference plus noise ratio of user k on tone n
$SNR_k^n$=signal to noise ratio of user k on tone n
$\Gamma_k^n$=SNR-gap normalization constant of user k on tone n
$R_k$=Data-rate of user k
$\omega_k$=scalarization weight of user k
$L(\Lambda)$=Langrangian function
$\alpha_k^n$=noise weight (also referred to as an approximation constant) for user k on tone n
$\beta_k^n$=approximation constant for user k on tone n
$\epsilon$=a very small positive constant
s=iteration number
$PSD_k^n$=PSD mask value for user k on tone n
$CLP_k$=A set of tonal indices for user k corresponding to clipped PSD components

DETAILED DESCRIPTION OF THE INVENTION

The present invention is described in connection with its preferred embodiment, namely as implemented into a multi-user digital subscriber line (DSL) system where discrete multitone (DMT) modulation is employed for communication between subscribers' customer premises equipment (CPE) and a central office (CO), and also between subscribers' CPE and remote terminals (RTs). These RTs are typically optical networking units (ONUs) or remote DSL access multiplexers (DSLAMs) deployed in modern DSL networks to shorten the length of copper twisted pair loops, with the aim of improving performance by decreasing the electrical signal attenuation on such lines. In the preferred embodiment, the said system will include an entity referred to as a spectrum management center (SMC) that coordinates the functions of one or more network elements (such as CPE, CO and/or RT) as described in detail below. In other embodiments, the SMC may directly control the functions of such network elements, or may not be present at all.

It should be kept in mind that this invention may also be applicable to a wide range of other types of networks, especially those in which crosstalk (or more generally multi-user interference) hinders performance.

FIG. 1 illustrates an exemplarity system, with which the preferred embodiment of the present invention can be implemented. By way of example, a number of user-groups are illustrated where some subscribers' CPE 190 are connected to a CO 140, that is in turn connected to an access network 1010 via high-speed infrastructure (for example, supported by an optical fiber leased-line) 130. Alternatively, user-groups may have their CPEs 190 connected to a RT 170 that is in turn connected to the access network 1010 through similar, but not necessarily shared, high-speed infrastructure. The access network 1010 is typically connected to some wide area network (WAN) 1000, such as the internet.

Pictured are M user-groups (UGs), with each group m=1, . . . , M comprising UG:m subscribers. Each subscriber communicates with the network by way of their CPE 190. Communication to and/or from the CPE 190 and the rest of the network occurs over a twisted pair loop 160 that is grouped into binders 180 along with the pairs of other users. The CPE side of the loop is named the network termination (NT). Each subscriber loop 160 is terminated at either a CO 140 or RT 170. This side of the loop is named the line termination (LT) end. It will be understood by those skilled in the art that typical DSL networks may comprise thousands of COs and RTs that can serve millions of subscribers.

Each subscriber loop is, of course, a bidirectional DSL connection. As such, information is communicated downstream from the CO 140 or RT 170 (LT side) to the CPE 190 (NT side), as well as on the upstream in the reverse direction, from the CPE 190 (NT side) to the CO 140 or RT 170 (LT side). Typically, each CO 140, RT 170 and CPE 190 is constructed as, or includes, a DSL modulator and demodulator (modem). These modems typically achieve bidirectional communication through frequency-division duplex (FDD) techniques that utilize disjoint frequency bands for downstream and upstream communication. An alternative scheme employing an overlapping spectrum using time-division duplex (TDD) is also known in the art that utilizes disjoint time periods dedicated to respective downstream and upstream directions.

As is well understood by those skilled in the art, such DSL connections are effected by broadband modulation techniques such as the DMT modulation scheme. In DMT, the bandwidth is partitioned into N independent subchannels, referred to as tones, having narrow bandwidth. In the ADSL standard, N=256 subchannels of 4.125 kHz width are utilized on the downstream, while N=64 subchannels are used on the upstream. For the ADSL2+ standard, the number of downstream subchannels is doubled to N=512, while VDSL increases this dramatically to a maximum of N=4096 subchannels. The data-stream to be transmitted using DMT is split into N substreams and each is mapped onto the independent subchannels. Due to crosstalk interference and line characteristics that vary across frequency, each subchannel may have a different capability to carry information. It is therefore of relevance to know how to best distribute the data-stream over the available subchannels, known as the "bit-loading" across the available subchannels. Going further, the information bearing capacity of each subchannel can be controlled to a certain extent by a judicious allocation of transmitter power for use in each subchannel. As is known to those skilled in the art, this is the essence of "power control"—to determine the best transmitter power spectrum density (PSD) over the available subchannels in frequency.

In the exemplary system of FIG. 1, subscriber loops comprise twisted wire pair conductors 160 are reside in a binder 180 common to other subscriber loops, at least some part of the distance along their length. As those skilled in the art know, such binders refer to a collection of twisted wire pair conductors that are contained in a common physical sheath. The close proximity of loops 160 within a binder 180 can induce electromagnetic coupling from one line to another, in turn inducing crosstalk interference. As can be appreciated by those skilled in the art, such crosstalk impairments can be a dominant source of noise. As the demand for higher data rates increases and communication systems move toward larger bandwidths and higher frequency bands, where the crosstalk problem is more pronounced, spectrum management becomes an issue of paramount importance. This is especially true in VDSL systems, where frequencies up to 30 MHz can be used.

Spectrum management attempts to define the spectra of various DSL services in order to limit the crosstalk interference between loops that may be deployed in the same binder. First attempts at spectrum management involved studies that defined typical and worst-case scenarios from which fixed spectra are obtained for each type of DSL, ensuring a limit to the mutual degradation between services. However, static measures such as these may lead to achievable data-rates that are far lower than what may be supported by the actual loop topology in practice. Dynamic spectrum management (DSM) addresses these shortcomings by shaping the power spectra of DSL loops according to the actual real-life scenario at hand. This process may be triggered by changes in the network topology (power-up and/or shut-down of a CPE modem), at periodic intervals, or even continuous adaptation in real-time or close to real-time.

To this end, the preferred embodiment (and some other embodiments) outlined herein also include a spectrum management centre (SMC) 110 that may interact with the modems at either the LT or NT, or both ends of one or more subscribers' loops. Such interaction, outlined in detail below, is undertaken via a bidirectional connection 120 to the access network, and the adjoining CO 140 or RT 170 as required. As those skilled in the art can appreciate, such interaction may reuse existing network switching infrastructure by embedding any communication messages in an out-of-band control channel (e.g. control packets or as headers included with any payload data). Going further, the functionality of the SMC may or may not be included in a network management center (NMC) that may be present in an existing DSL network (not shown in FIG. 1).

The present invention uses information on line characteristics (for example, direct and crosstalk power transfer characteristics) and user requirements (for example, PSD masks, minimum subscriber data-rate requirements, maximum total transmission power) to enhance the performance of the communications system through the analysis of such information, and subsequent determination of operational parameters such as modem PSDs and bit-loadings. In the preferred embodiment, such determination is effected by a "centralized scheme" where decisions are made by a centralized entity such as a SMC and where appropriate directives of operational parameters are communicated to relevant DSL modems. Other embodiments are effected by an alternative "distributed scheme", where decisions are not made centrally although some sort of central coordination (for example, by a SMC) may be of benefit. In such a distributed scheme, modems can formulate appropriate directives independently, based on local measurements of line characteristics and knowledge of appropriate user requirements, and with additional information offered by a centralized coordinator.

The performance of the communications system may be characterized by the total data-rate of all users in the network. However, some system operators may wish to offer differentiated services, for example, by offering a faster service at a higher price (a relative measure), or a guaranteed minimum data-rate (an absolute measure). In light of these issues, the system operator may be interested in a communication system that can offer the greatest selection of data-rates for subscribers, or provide a base-line (absolute) minimum data-rate to as many subscribers as possible. In order to achieve these goals, it is necessary to make best use of available transmission power: an optimization of the transmit PSD of each DSL modem, sometimes referred to as "spectrum balancing".

Figure 2:
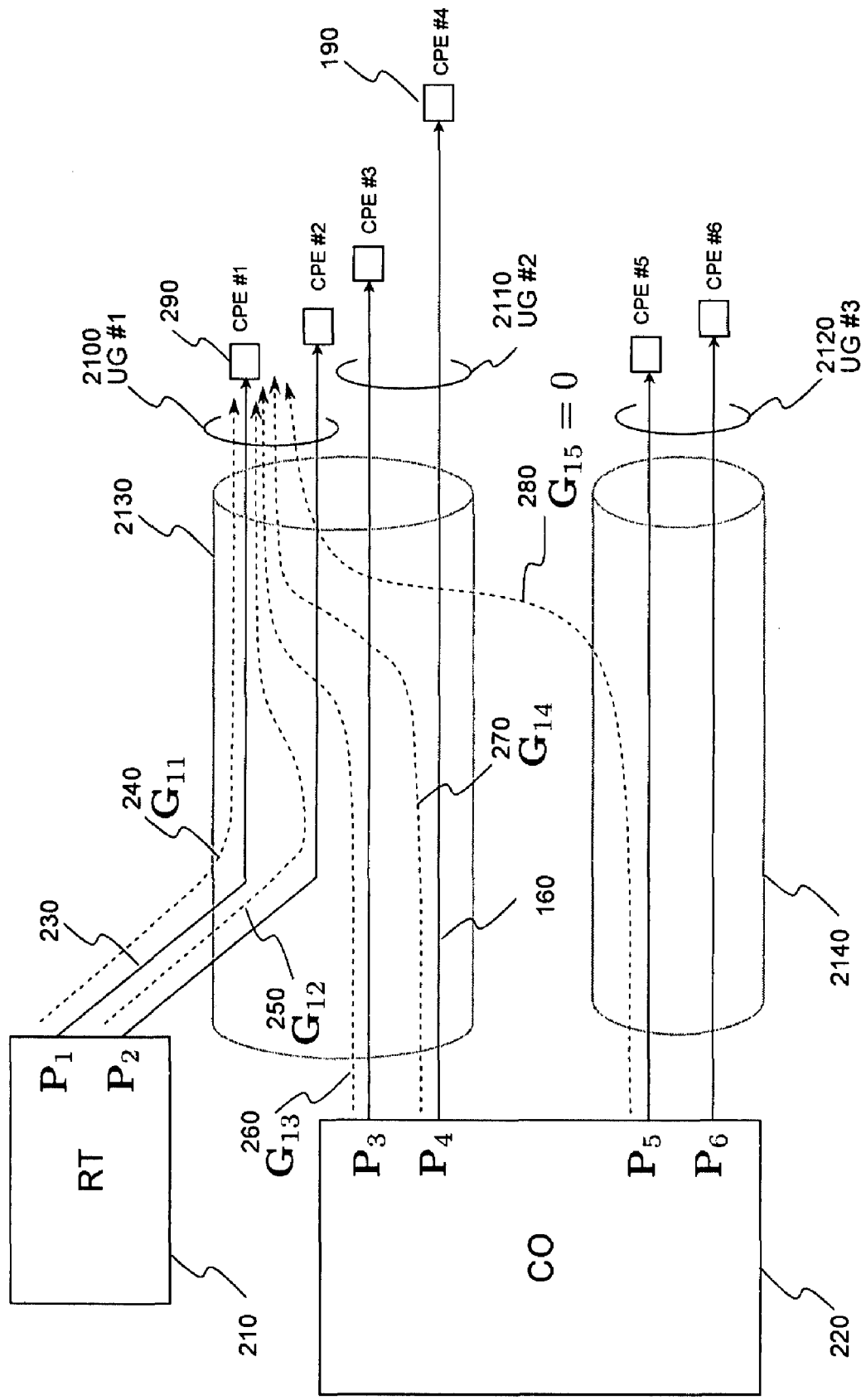
FIG. 2 is a schematic diagram depicting a portion of a DSL communications system, showing two binders that accommodate three user-groups. A number of sources of far-end crosstalk (FEXT) interference are shown in connection with the DSL modem customer premises equipment (CPE) of the first subscriber.

A better understanding spectrum balancing and how it may lead to improved system performance is given by way of an example. FIG. 2 illustrates a portion of the exemplary system when only K=6 users and M=3 user-groups (UGs) are present. To simplify the example, only the downstream direction of the bidirectional system is considered. The user-first group has LTs at the RT 210, the second and third user-groups have their LTs at the CO 220. User-group #1 2100 shares a binder 2130 with user-group #2 2110. The third user-group 2120 exists in a separate binder 2140.

Associated with each user k=1, K, 6 is a modem at the LT that transmits DMT modulated signal with a PSD given by the N-length vector $$P_k = [P_k^1, P_k^2, K, P_k^N] \qquad \text{Eq. (1)}$$

Each component of this vector corresponds to the transmit power associated with the n th DMT subchannel (hereon referred to as a "DMT tone" or just "tone").

Also associated with each user k is a set of N-length channel transfer vectors $$G_{jk} = [G_{jk}^1, G_{jk}^2, K, G_{jk}^N] \qquad \text{Eq. (2)}$$

The n-th component of this vector corresponds to the loop transfer gain on tone n from the transmitter of user k, to the receiver of user j. For example, the direct loop transfer gain of user #1 corresponds to $G_{11}$ 240 and completely characterizes the frequency-dependent channel transfer characteristics of the N downstream subchannels along loop #1 230 from RT 210 to CPE #1 290. Due to the close proximity to other lines in the binder 2130, signal power from these other lines will couple into line #1 as crosstalk interference. The degree to which this frequency-dependent interference will couple into line #1 is completely characterized by the crosstalk transfer gains represented by the vectors $\{G_{1j}: j=2, K, 6\}$.

Still with reference to FIG. 2, the interference illustrated corresponds to the so-called "far-end" crosstalk (FEXT): interference that is injected into the receiver from the "other end" of the binder. Interference can also be injected into the receiver by upstream transmitters located on the same side of the binder: so-called "near-end" crosstalk (NEXT). Although not pictured in FIG. 2, these two types of interference can occur at the LT side of the loop when the respective directions and roles of receivers and transmitters are reversed. In general, NEXT can be ignored due to the FDD or TDD separation of upstream and downstream transmissions. The embodiments of the present invention ignore NEXT, although such interference can be readily included by a person skilled in the art having reference to this specification and its drawings, should non-overlapping up-and downstream transmissions be employed.

As outlined above, RTs are deployed in order to increase performance by shortening the loop length. In the example of FIG. 2, the RT-based loops 2100 are then physically much shorter than the CO-based loops 2100 and 2120, resulting in more favorable (i.e. larger) direct channel transfer vectors $G_{11}$ and $G_{22}$ for users 1 and 2 respectively; and ultimately an opportunity to achieve a greater downstream data-rate for those users. Physically shortening the RT-based loops 2100 also brings the RT 210 closer to the CPE of the CO-based loops 2110. This can result in excessively high levels of FEXT from the RT 210 to the CO-based CPE, as compared to the corresponding FEXT from other CO-based users. Since the CO-based loops 2110 are much longer, their direct channel transfer vectors are much weaker (i.e. smaller), resulting in a greater susceptibility to FEXT. In such so-called "near-far" scenarios, it becomes important to appropriately manage the spectra of CO- and RT-based loops, to balance the tradeoff between the rates of each user-group. The aim of spectrum balancing is to find the "perfect" balance of spectrum usage that achieves the goals of the system operator (for example, maximizing the network data-rate or meeting minimum data-rate targets).

It may be that the crosstalk transfer gains from lines within one binder group to other lines within another binder group are zero (or negligible so that they may be practically presumed to be zero). In that case, the transmissions on loops in one binder group have no effect on other lines in other binder groups: the mutual crosstalk is nonexistent. For the user-groups pictured in FIG. 2, the third user-group associated with binder 2130 is completely isolated from the other user-groups contained in a different binder 2140 and so the crosstalk transfer gains $G_{15}$ 280 in this case are all zero. Where there are isolated binder groups such as these, each isolated group may be optionally partitioned into separate sets of user-groups, and each set treated as belonging to an independent system in its own right.

Figure 3:
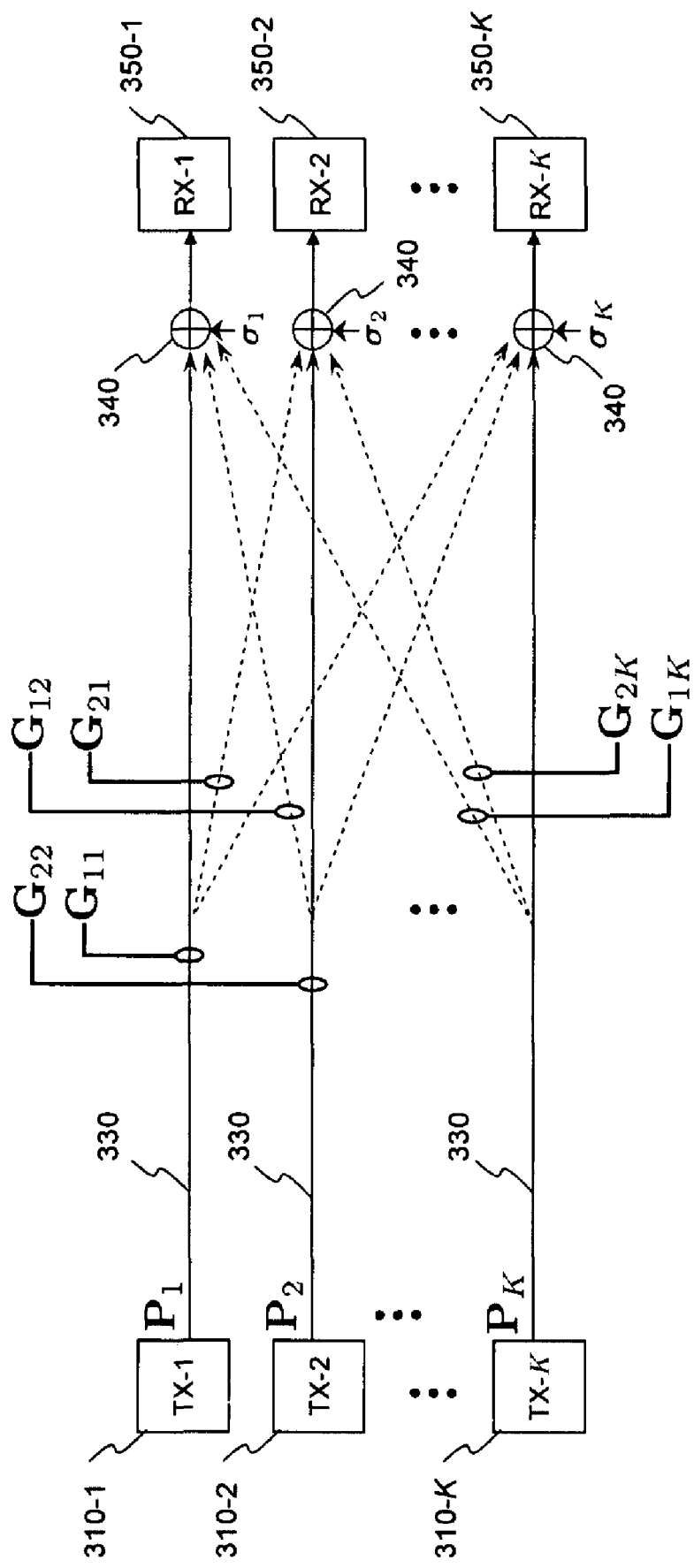
FIG. 3 is diagram showing a channel model of the DSL communications system, showing the crosstalk interference between DSL lines and another noise source incident to each receiver.

FIG. 3 illustrates a generalized schematic abstraction, within which the preceding specific example system fits. The total quantity of users whose PSD may be controlled is denoted by K. Associated with each user k=1, K, K is a transmitter 310-k, connected to a receiver 350-k via the subscriber loop 330. Each transmitter makes use of a DMT modulated signal having N tones, with a transmit PSD of $P_k$ as given by equation 1. The transmitted signal of a particular transmitter k reaches all other receivers as determined by the channel transfer gain vectors $\{G_{jk}: j=1, K, K\}$ and as outlined above. Thus a given receiver j will be subject to the desired communication signal emanating from its paired transmitter j, and FEXT interference from all other transmitters. In practice, other frequency-dependent noise sources are also present, lumped together and represented by the vector $\sigma_k = [\sigma_k^1, \sigma_k^2, K, \sigma_k^N]$. As can be appreciated by a person of ordinary skill in the art, such frequency-dependent noises are the combination of thermal noise present in the receiver electronics and also noise from other radio-frequency (RF) sources such as radio transmitters, or other neighbouring DSL systems that may be present, that are not any of the K users under consideration. All of the signals (desired signal, FEXT interference and other noises) physically combine by superposition at the input of the receiver. This physical phenomenon is equivalently represented as the summation 340.

By way of example, the preferred embodiment will relate to a bidirectional DSL system as pictured in FIG. 1, where only the downstream direction is considered. It will of course be understood by those skilled in the art having reference to this specification and its drawings, that the upstream direction is similarly treated, with both directions of the system being simultaneously dealt with by the straightforward combination of the embodiments outlined herein.

Figure 4:
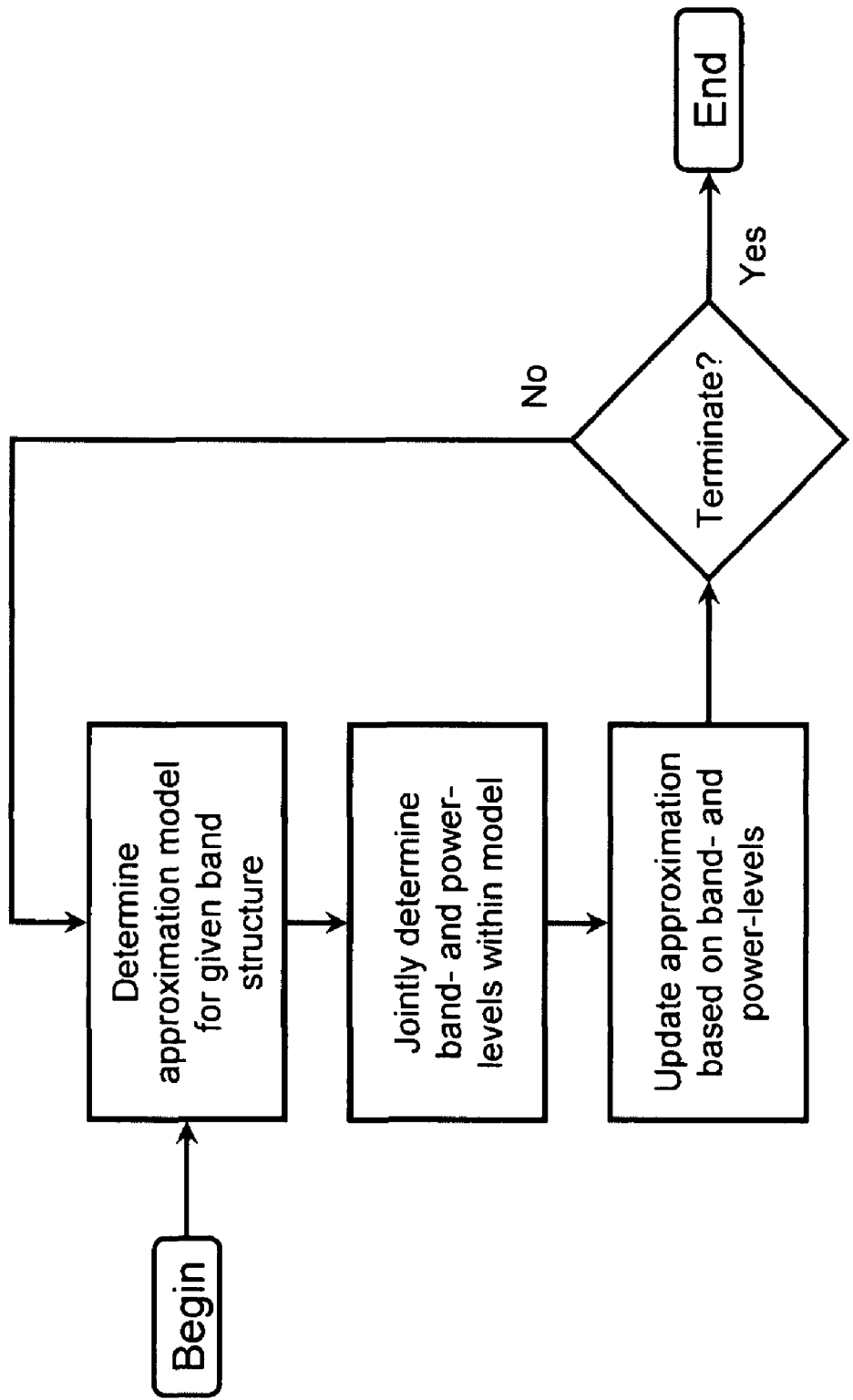
FIG. 4 is a diagrammatic flowchart of the underlying procedure of determination of a method of spectrum management of digital communication systems in accordance with the invention.

FIG. 4. shows a method for distributed spectrum management of digital communication systems having a plurality of communication lines on which signals are transmitted and received by respective users. The method comprising the steps of receiving information about line, signal and interference characteristics of a plurality of the communication lines from a plurality of sources. Each user's power spectrum is modelled according to predetermined requirements and categorised into a number of bands with predetermined bandwidth. It is therefore necessary to determine constraints on power allocation of particular plurality of the communication lines of the bands of each user's power spectrum. This is achieved by determining the constants for the model based on the predetermined number and width of bands for each user's spectrum. A critical step is the decoupling by assessing the power levels within each band assuming the other bands have a predetermined maximum interference from other users. It is then by undertaking an iterative feedback of each band of each user to reassess the power levels within each band to a predefined optimised level. These determined power levels can be used in a transmittable mask to place constraints on power allocation of particular plurality of the communication lines between respective transmitter and receiver taking into consideration the determined line, signal and interference characteristics of a plurality of the communication lines and consideration of the determined constraints on power allocation of the communication lines to allow required effective data-rates for each of said respective users to be satisfied.

Figure 5:
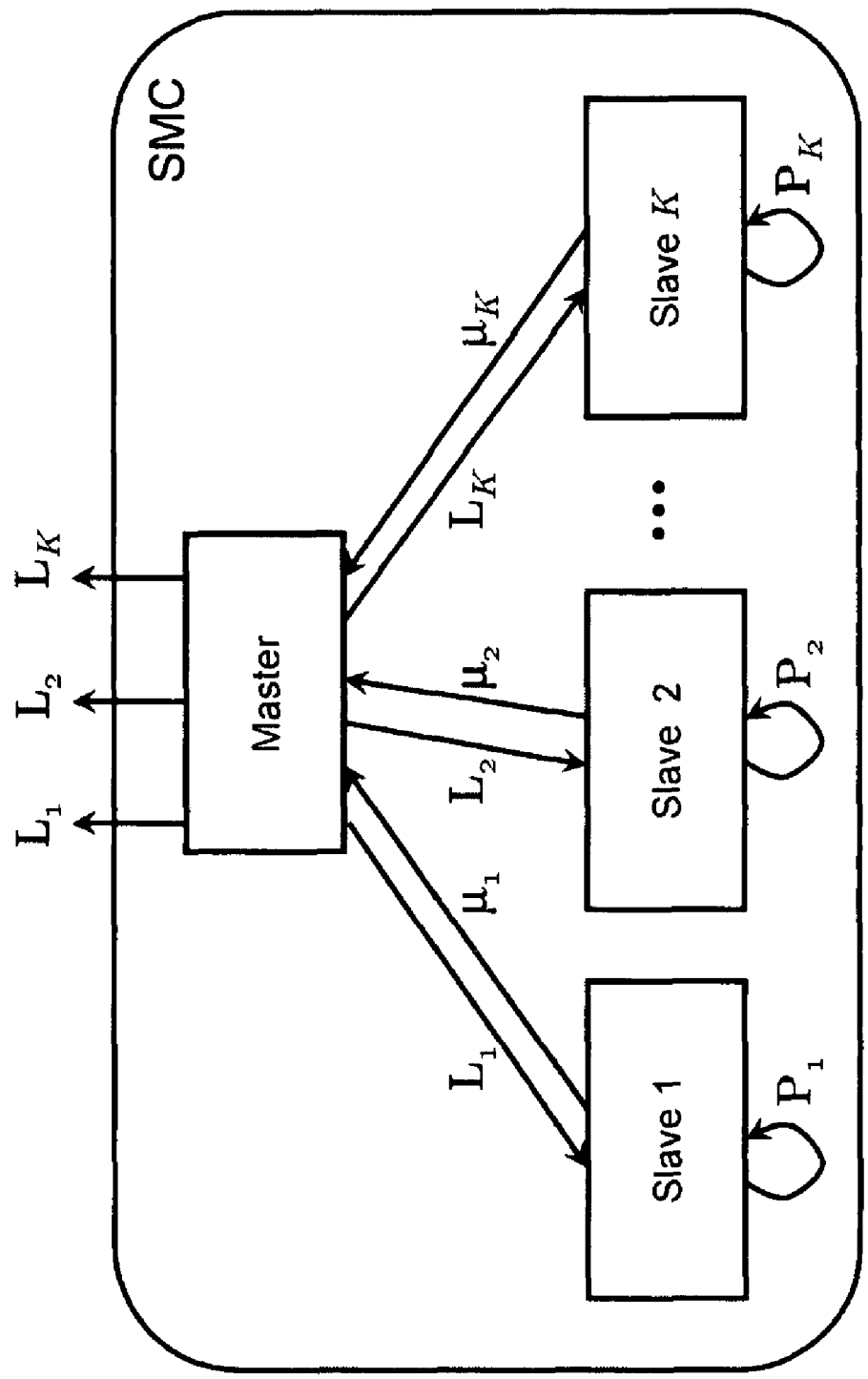
FIG. 5 is a diagrammatic view of a particular embodiment of implementing the method of distributed spectrum management of digital communication systems in accordance with the invention in which the master and slave is undertaken in the spectral management centre and resulting power levels sent to the user modems.
Figure 6:
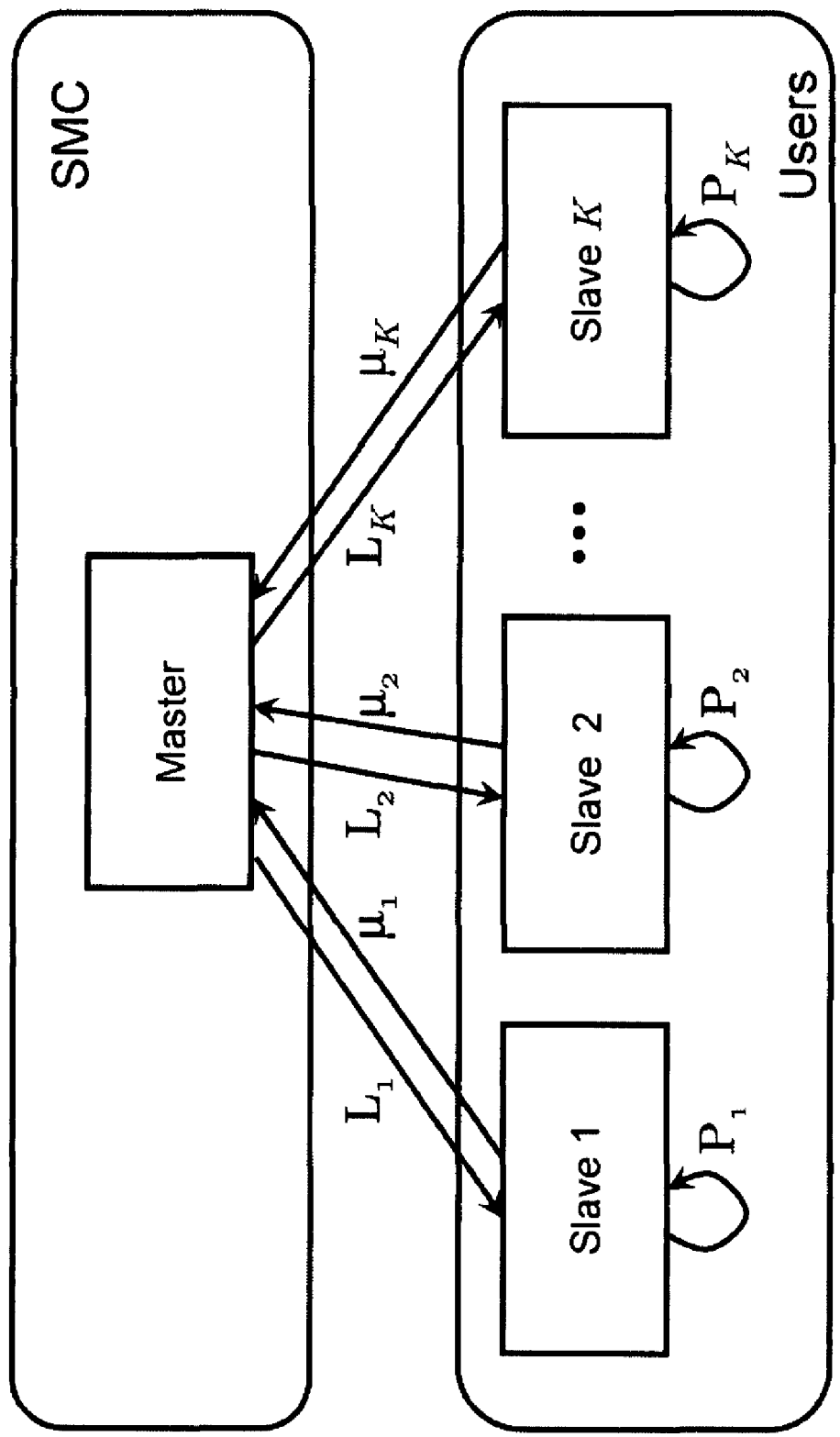
FIG. 6 is a diagrammatic view of a further particular embodiment of implementing the method of distributed spectrum management of digital communication systems in accordance with the invention in which the master is undertaken in the spectral management centre and resulting power levels sent to the user modems undertake the slave and feeds back to the spectral management centre for use to other user modems.

In order to solve the optimisation a referred approach is a master slave approach that will be further described below. In FIGS. 5 and 6 there are two preferred embodiments of a digital communication system according to the invention in which the spectral management center has a power allocation determinator for receiving a modelled power level and a noise weight from each user communication line and is able to determine allocated power of its respective communication line based on the optimised determined power needs of the plurality of communication lines of the digital communication systems. In one form all of the calculations are undertaken in the SMC as shown in FIG. 5. In another form as shown in FIG. 6 the master is undertaken in the SMC while the slave is undertaken at the user's modem and the power level of an individual communication line and its interference by adjacent lines is determined at the user's modem and communicated to the spectral management center.

This invention uses novel techniques to optimize current-day digital subscriber line (DSL) networks, such as those based on the ADSL2 and VDSL standards, through band preference (BP). Masks on the power allocated across frequency by iterative water-filling (IWF) are sought, to shape its performance in those circumstances where it would otherwise perform far from the optimum. SCALE is a low complexity distributed solution to the spectrum-balancing problem, which can be used to provide these mask values in the special case of unity band-sizes.

Also the invention provides a novel optimization framework that avoids the inherent difficulties of the BP problem: that of coupling between users induced by the IWF procedure. It uses a highly efficient algorithm named SCAPE that is easily customized for any band-size and clustering pattern, particularizing to the spectrum-balancing problem in the special-case of unit band-sizes. Our solution comprises a two-level primal decomposition whereby a master problem is responsible for band management, based on the relaxed water-filling result of a number of independent slaves. Numerical results show that two bands are sufficient for a downstream near-far scenario comprising two user-groups.

IWF can be far from optimal, since the performance gap therein lies with the damage one user's power allocation has on the performance of others: IWF does not explicitly take such information into account.

The aim of band preference (BP) is to remedy this situation. It was conceived because all known solutions to the spectrum-balancing problem at the time were both computationally prohibitive and centralized. Such methods, it was concluded, were not practical and could not adapt to the slowly-varying DSL channel in real-time. BP essentially corrects for the selfish nature of IWF by placing simple constraints on the PSDs allocated by water-filling. These restrictions may comprise PSD masks or per-tone bit-loading limits. They are typically determined by, and delivered to modems from, a spectrum management center (SMC) that acts as a quasi-static co-ordinator. It was envisaged that, after an initial BP directive, the usual bit-swapping procedures could take care of any dynamism in the loop response independently of the SMC. Of course, further BP directives are also possible, to reset any "wind-up" that might occur on a longer time-scale.

SCALE is a distributed protocol that appears to alleviate the problems outlined above. However the relevance of an IWF enhancing scheme, is that with BP, we have a real opportunity to enhance current-day systems, in particular, with hooks that already exist in current DSL standards, such as those surrounding ADSL2 and VDSL.

The main crux of BP lies in a constraint design that improves the performance of IWF. As implied by the name, BP splits each user's power spectrum into a number of bands, a kind of clustering operation originally devised to reduce the complexity of the associated design. Our focus is on PSD mask constraints since other extensions, such as maximum bit-loadings, straightforwardly follow from the developments outlined herein.

This design problem is by no means easy; the coupling of users by the IWF procedure makes analysis difficult. A different approach is required.

Our offerings stem from a novel optimization framework that casts the BP problem into one where IWF users are decoupled. Analysis becomes straightforward, however the resulting problem is shown to be non-convex and NP-hard, much like the spectrum balancing problem. The two problems are very similar in fact, and we show their equivalence in the special case of unity band-sizes.

To solve the decoupled problem, we further make use of the ideas from SCALE, resulting in a new algorithm named SCAPE (Successive Convex Approximation for band PreferencE).

We show how our framework is easily decomposed into a so-called two-level optimization problem, where a master is responsible for the management of band masks; several lower problems are each a form of water-filling. In this way, SCAPE provides insight into the method proposed in [39], while further providing an efficient realizable algorithm that stems directly from the theory developed.

The key contributions of this invention can be summarized as follows:

We show that water-filling is not actually required for IWF-based autonomous spectrum balancing when the PSD masks supplied satisfy the maximum-power constraint: the PSDs are trivially given by the masks themselves, motivating the use of a spectrum balancing solution—such as provided by SCALE—to compute the required masks in the case of unity band-sizes.

A novel optimization framework for band preference design, where each IWF user is decoupled. Such a formulation is based on worst-case crosstalk from each user. While this method provides a lower bound on the performance of the coupled system, it naturally recovers the spectrum balancing problem in the special case of unity band-sizes. Additionally, we show this problem to be NP-hard, in much the same way of the spectrum balancing problem.

A novel algorithm named SCAPE (Successive Convex Approximation for band PreferencE) that employs a series of convex relaxations to realize the above mentioned optimization framework. Each relaxation is itself solved by a two-level primal decomposition having a highly efficient implementation. In the true spirit of band preference, the master problem is concerned with the provisioning of band levels, based on the result of lower-level slave problems that make use of the relaxed water-filling ideas of SCALE.

Below we introduce the system model. Then we introduce the band preference design problem and shows that with unity bandsizes, the SCALE algorithm can be used to derive the bandmask values. Further we show our novel optimization framework that decouples each IWF user by way of a worst-case design. The resulting optimization problem is shown to be nonconvex and NP-hard. Further we develop the SCAPE algorithm to solve this worst-case design problem with a sequence of convex relaxations. Each relaxation is approached with a two-level primal decomposition, where we provide an efficient implementation that makes use of a relaxed form of water-filling. Numerical performance evaluations follow, where we also offer some advice on band pattern design.

The details of the structure of SCALE, SCAWF and the use of IWF are further described in U.S. Patent application entitled Method for Distributed Spectrum Management of Digital Communications Systems filed contemporaneously herewith as application Ser. No. 11/433,025 filed May 12, 2006, the disclosure of which is incorporated herein by reference.

System Model

We make use of a standard system model for an xDSL system. In this model, each of the K users employs discrete multi-tone (DMT) modulation over N tones that are used to form a set of ISI-free orthogonal subchannels. We make the usual assumption that users are aligned in frequency such that far-end crosstalk (FEXT) coupling occurs on a common tone-by-tone basis.

A fixed frequency band-plan is assumed for simplicity, which partitions each of these tones into separate up-and down-stream bands that are the same for all users. While it is known that such a scheme is not optimal, partitions are a common way to avoid near-end crosstalk (NEXT). The algorithms developed in this invention are easily extended to include NEXT coupling if required. These bands, for up-and down-stream (frequency division) duplexing should not be confused with the bands associated with BP, introduced further below.

We consider continuous bit-loading where the achievable loading on tone n, user k is $$b_k^n(P^n) \triangleq \log(1 + SIR_k^n(P^n)) \quad (6.1)$$

in the units of nats, and where the corresponding signal-to-interference ratio (SIR) is defined as $$SIR_k^n(P^n) \triangleq \frac{G_{kk}^n P_k^n}{\sum_{j \neq k} G_{kj}^n P_j^n + \sigma_k^n}. \quad (6.2)$$

We denote by $P_k^n$ the transmitter power of user k on tone n. For notational convenience, we write $P^n = [P_1^n, P_2^n, \ldots, P_K^n]^T$ as the K-length vector of all transmitter powers on tone n. We will also make use of the notation $P_k = [P_k^1, P_k^2, \ldots, P_k^N]$ as the N-length PSD vector of user k. The K×N matrix P is produced by stacking these vectors in the obvious way. This notation makes clear the explicit dependence of the SIR on power. In the sequel, vector-or matrix-inequalities are always element-wise.

The gains $G_{jk}^n$ model the channel power transfer on tone n from user j to the receiver of user k. For further notational convenience, we assume the gains $G_{kk}^n$ have been normalized by an appropriate SNR-gap $\Gamma k_k^n$, that depends on the coding scheme, target probability of error and noise margin. We further assume these gains are obtained either through measurement, or from standard crosstalk models and knowledge of the loop topology.

Each $\sigma_k^n$ models the received noise power on tone n. We assume the noise powers are constant, modelling receiver thermal noise plus any background noise injected by other co-existing systems (e.g. HDSL, ISDN, RF noise, etc.).

The achievable rate for user k is then $$R_k(P) \triangleq \sum_{n=1}^{N} b_k^n(P^n) = \sum_{n=1}^{N} \log(1 + SIR_k^n(P^n)) \quad (6.3)$$

nats per channel use.

We assume that all K users are coupled through interference to some degree. This is without loss of generality, as any user population can always be partitioned into sub-groups of non-interfering users, with each independent subgroup considered separately.

For the purposes of BP, we assume that the PSD of each user is constrained by exactly M bands, with the same clustering (band) pattern uniformly applied across all users. This assumption is made in the interest of notational simplicity; the results provided do not change significantly when this is not the case. We will make use of the function c:[1,N]→[1,M] to map from tone n to band mask m, further simplifying the notation We denote the spectral-masks (band masks) associated with a user k by $L^m_k$, where $m \in [1,M]$ denotes the band number. These masks will ensure that components of the PSD obey the condition $P_k^n \leq L_k^{c(n)}$ for each tone n associated with user k.

Lastly, we will employ the notation $L_k = [L_k^1, \ldots, L_k^M]$ to denote the length-M band mask vector associated with user k, with the K×M matrix L formed by stacking these in the obvious way. Below is a summary of the standard iterative water-filling (IWF) procedure.

---

1:    Initialize all user PSDs: P = 0
2:    repeat
3:       for each user k = 1 to K do
4:          Water-fill: with the PSDs $\{P_j : j \neq k\}$ of other users fixed, find $$P_k = \arg\max_{P_k \geq 0} R_k(P) \quad (6.4a)$$

$$\text{s.t.} \sum_{n=1}^{N} P_k^n \leq P_k^{max} \quad (6.4b)$$

$$P_k^n \leq L_k^{c(n)}, \quad n = 1, \ldots, N. \quad (6.4c)$$

5:       end for
6:    until convergence of all PSDs
7:    return PSDs of all users P

---

The Band Preference Design Problem

Like the spectrum balancing problem, the BP problem can take a rate adaptive (RA), fixed margin (FM), or mixed form. We recall that the aim of the RA problem is to maximize the data-rate of all users, subject to per-user maximum power constraints. The FM problem, on the other hand, is concerned with finding a minimal power allocation such that each user has a minimum (or target) data-rate that is attained.

We focus on the RA problem for brevity. Extensions to the general problem are straightforward and follow from a similar approach.

The mathematical formulation of the RA form of the BP problem is given by $$\max_{L \geq 0} \sum_k \omega_k R_k(P_{IWF}(L)) \quad (6.5)$$

where $\omega_k$ are the priority-weights associated with each user. The matrix-valued function $P_{IWF}(L)$ provides the IWF power allocation for all users under fixed band masks L. In general, this function does not have closed form, and is evaluated by way of the standard IWF procedure.

The optimization is difficult in general, because we know little about the function $P_{IWF}(L)$—we do not even know its first partial derivatives. Nonetheless, trivial solutions can exist, as we now demonstrate.

Trivial Solutions—General Characterization

Result 1. With reference to the IWF procedure (summarized in FIG. 6.1), a fixed set of band masks L that satisfy $$\sum_{n=1}^{N} L_k^{c(n)} \leq P_k^{max}, k = 1, \ldots, K \quad (6.6)$$

results in a closed-form solution having (k,n)-th component $[P_{IWF}(L)]_{k,n} := L_k^{c(n)}$.

Proof. Consider the water-filling problem (6.4) for user k=1 on the first outer iteration. With condition (6.6) satisfied, all PSD mask constraints (6.4c) are active at the optimum solution and the maximum power constraint (6.4b) does not come into play.

As a result, the solution to this water-filling problem is trivial: components of the PSD $P_k=1$ are given by the mask itself on every tone. This holds for all k; and so all users are consequently decoupled and subsequent outer iterations are not required.

Unity Band-Sizes: Spectrum Balancing Derived PSD Masks

With unity band-sizes, the BP problem (6.5) is equivalent to the RA spectrum-balancing problem: both maximize the rates of all users with complete control over each user's PSD. It then follows that a solution to the spectrum-balancing problem also solves (6.5).

This observation has a practical consequence: an algorithm that produces any feasible solution to the spectrum balancing problem centrally—globally-or sub-optimum—need only send the resulting PSD allocation to each user in the form of a PSD mask. Since condition (6.6) is always met in this case, Result 6.1 tells us each IWF user adhering to its assigned PSD mask will subsequently arrive at exactly the same power allocation provided by the spectrum balancing operation. Furthermore, water-filling is not actually required, as the solution is known in closed form.

The SCALE algorithm is ideally suited to this task, as a highly efficient implementation exists, with performance that is very nearly globally optimum.

Decoupling IWF Users

The number of bands M is generally less than the number of tones N, resulting in band-sizes greater than unity. In this case, the IWF procedure couples all users and the optimization (6.5) becomes difficult to analyse We avoid this issue by employing a worst-case design. We modify the usual IWF procedure of FIG. 6.1 so that interference from all other users is fixed to a worst-case value, rather than the actual value given by $P_{j \neq k}$. This subsequently decouples all users. We exploit the fact that users must obey their band masks. Indeed, a sensible worst-case limit on the power emitted by a user j on tone n is the mask value $L^{c(n)}$. The following worst-case design problem results:

$$\max_{P,L \geq 0} \sum_k \omega_k R_k^{WC}(P_k, L_{-k}) \quad (6.7a)$$

$$\text{s.t.} \sum_n P_k^n \leq P_k^{max}, \forall k, \quad (6.7b)$$

$$P_k^n \leq L_k^{c(n)}, \forall k, n, \quad (6.7c)$$

where $L_{-k}$ denotes the matrix of masks L with the k-th row omitted. We have implicitly defined the worst-case achievable rate for user k on tone n as $$R_k^{WC}(P_k, L_{-k}) \triangleq \sum_n \log\left(1 + \frac{G_{kk}^n P_k^n}{\sum_{j \neq k} G_{kj}^n L_j^{c(n)} + \sigma_k^n}\right) \quad (6.8)$$

$$= \sum_n \log(1 + SWIR_k^n(P_k^n, L_{-k})), \quad (6.9)$$

and also the Signal to Worst-case Interference Ratio (SWIR) as $$SWIR_k^n(P_k^n, L_{-k}) \triangleq \frac{G_{kk}^n P_k^n}{\sum_{j \neq k} G_{kj}^n L_j^{c(n)} + \sigma_k^n} \quad (6.10)$$

to simplify notation in the sequel.

Problem (6.7) simultaneously optimizes user PSDs as well as the masks. At first glance it appears that we have increased the number of optimization variables from MK to MK+NK: a step in the reverse direction as judged by the band preference philosophy of tonal clustering for problem size and complexity reduction. While the problem size has certainly increased, it allows for a highly efficient implementation by way of a two-level primal decomposition that is developed in the sequel.

This new problem produces a lower-bound on the solution to the coupled BP problem (6.5). We envisage that once a solution {P*,L*} is found, masks L* can be used in the usual IWF procedure to obtain a PSD allocation $P_{IWF}(L^*)$ that is closer to the true solution of the BP problem (6.5).

Whilst this optimization comprises closed-form functions that may lead to a straight-forward solution approach, it turns out that the problem is NP-hard. Rewriting the worst-case achievable rate (6.8) as $$R_k^{WC}(P_k, L_{-k}) = \sum_n \log\left(G_{kk}^n P_k^n + \sum_{j \neq k} G_{kj}^n L_j^{c(n)} + \sigma_k^n\right) - \log\left(\sum_{j \neq k} G_{kj}^n L_j^{c(n)} + \sigma_k^n\right),$$ (5)

we see that it comprises a difference of concave (d.c.) functions in P and L. Non convex optimization problems such as (6.7) having d.c. structure are known to be NP-hard in general and often difficult to solve efficiently for the global optimum [33].

Recovering the Spectrum Balancing Problem

Our lower-bound formulation (6.7) is a natural one: it generalizes the spectrum balancing problem, as our next result shows.

Result 2. The BP problem (6.7) specializes to the RA spectrum balancing problem with unity band-sizes, when M=N and c(n)=n.

Proof. Since the objective is increasing in each $P_k^n$, and decreasing in $L_j^n$, we will always have that constraints (6.7c) will be met with equality at the optimum solution. We therefore have that $L_k^n = P_k^n$. The problem can then be simplified to:

$$\max_{P \geq 0} \sum_k \omega_k R_k^{WC}(P_k, P_{-k})$$

$$\text{s.t.} \sum_n P_k^n \leq P_k^{max}, \forall k$$

and is exactly the RA spectrum balancing problem.

This is a desirable property since, in general, as the number of bands M approaches the number of tones N, performance should improve and approach that provided by the spectrum balancing solution where the most degrees of freedom are available.

Successive Convex Approx. for band PreferencE (SCAPE)

We will make use of the successive convex relaxation ideas presented to solve the non-convex BP problem (6.7). The procedure hinges on the lower bound $$\alpha \log z + \beta \leq \log(1 + z)$$ (6.11)

that is tight at $z = z_0$ when the approximation constants are chosen as $$\alpha = \frac{z_0}{1 + z_0}$$ (6.12a)

$$\beta = \log(1 + z_0) - \frac{z_0}{1 + z_0} \log z_0.$$ (6.12b)

Applied to the worst-case achievable rate (6.8), we have $$\tilde{R}_k^{WC}(P_k, L_{-k}; \alpha_k, \beta_k) \triangleq$$ (6.13)

$$\sum_n \alpha_k^n \log(SWIR_k^n(P_k^n, L_{-k}^n)) + \beta_k^n \leq R_k^{WC}(P_k, L_{-k})$$

where $\alpha_k = [\alpha_k^1, \ldots, \alpha_k^N]$ and $\beta_k = [\beta_k^1, \ldots, \beta_k^N]$ are fixed approximation vectors associated with each user k. Embedding this lower-bound into the worst-case design problem (6.7) produces the relaxation:

$$\max_{P, L \geq 0} \sum_k \omega_k \tilde{R}_k^{WC}(P_k, L_{-k}; \alpha_k, \beta_k)$$ (6.14)

$$\text{s.t.} \sum_n P_k^n \leq P_k^{max}, \forall k,$$

$$P_k^n \leq L_k^{c(n)}, \forall k, n.$$

Although this relaxation remains non convex—the d.c. structure of (6.13) is retained—we can make use of a logarithmic change of variables $\tilde{P}_k^n = \log P_k^n$ and $\tilde{L}_k^n = \log L_k^n$ to recast the problem as a convex optimization. Our subsequent developments will therefore deal with the problem in this logarithmically transformed space.

Solving this relaxation results in a lower-bound solution to the worst-case design problem (6.7) and in turn, a lower bound to the original BP problem (6.5).

We can successively improve these lower bounds by adapting the approximation constants according to (6.12) at the solution to each relaxation. This results in the procedure:

```
1:  Initialize all α_k^(0) = 1, β_k^(0) = 0 (a high-SWIR approximation)
2:  Initialize all PSDs P_k^(0) = 0
3:  Initialize all PSD masks to the noise level L_k^(0) = [σ_k^1, σ_k^2, ..., σ_k^N]
4:  Initialize iteration counter t = 1
5:  repeat
6:      Maximize: solve relaxation (6.14) to give solution {P^(t), L^(t)}
7:      Tighten: update elements of α_k^(t+1), β_k^(t+1) using (6.12) at z_0 = SWIR_k^n(P_k^n(t), L_{-k}^n(t))
8:      Increment t
9:  until convergence
```

We will refer to this algorithm as SCAPE (Successive Convex Approximation for band-PreferencE). It is guaranteed to converge to a Karush-Kuhn-Tucker (KKT)-point of the non convex problem (6.7). The proofs are omitted.

There exists many techniques to solve the convex relaxation (6.14) in the maximization step above—using an interior point method for example. We nevertheless derive a simple and efficient implementation in the following subsections. Our developments will make use of an iterative primal decomposition having the advantage that, at each iteration, user PSDs always remain feasible. Subsequently, a full maximization is not required before proceeding to tightening—in practice, only an improved objective is required. Most importantly, our developments provide further insight into the band preference scheme.

Two-Level Primal Decomposition

We make use of the separability of the relaxation (6.14) to re-write it as the following two-level optimization problem:

$$\max_{\tilde{L}} \sum_k \omega_k \left\{ w_k(\tilde{L}_k) - \sum_n \alpha_k^n \log\left(\sum_{j \neq k} G_{kj}^n \exp(\tilde{L}_j^{c(n)}) + \sigma_k^n\right)\right\} \quad (6.15)$$

$$\text{s.t.} \, w_k(\tilde{L}_k) = \max_{\tilde{P}_k} \sum_n \alpha_k^n \log\left(G_{kk}^n \exp(\tilde{P}_k^n)\right) + \beta_k^n \quad (6.16a)$$

$$\text{s.t.} \sum_n \exp(\tilde{P}_k^n) \leq P_k^{max} \quad (6.16b)$$

$$\tilde{P}_k^n \leq \tilde{L}_k^{c(n)}, \forall n \quad (6.16c)$$

$$k = 1, \ldots, K.$$

While this two-level optimization framework may appear more complicated than the relaxation (6.14), it admits an elegant and intuitive interpretation that is aligned with the original spirit of BP design. Here, the upper-level (master) problem (6.15) is responsible for setting the band mask levels. These are updated in a systematic way based upon the result of lower-level (slave) problems (6.16) that are each associated with a user $k \in [1,K]$. It turns out that these slave problems are a relaxed form of water-filling.

Most importantly, several practical advantages are to be had with this framework that are not readily apparent from direct analysis of the monolithic problem (6.14). Each slave problem can be solved by an efficient algorithm similar to SCAWF, the purely iterative water-filling method, with modifications that incorporate the PSD mask constraints fed from the master. Each is also independent and thus all slave problems can be computed in parallel.

Going further, we provide a distributed protocol based on this framework. User modems act out the slave role, undertaking a relaxed water-filling operation based on masks provided by the SMC. Unlike the framework above, based on worst-case interference, users would do so according to measured (actual) interference. The SMC takes the master role, determining updated mask values based on feedback from user modems. This process is repeated at regular intervals, indefinitely, to track changes in the network.

Conceptually speaking, this process is not that far removed from the SCALE protocol. Unfortunately we may not always have the luxury of such a major architectural change to an existing xDSL deployment. Subsequently, a centralized implementation may be preferable in practice, where masks are computed by the SMC and passed to user modems, making use of existing hooks in the relevant standards.

On the other hand, when looking toward the design of future systems, a distributed scheme maybe better suited—in which case the SCALE protocol is preferable over the distributed scheme just described, as SCALE admits a simpler implementation and performs slightly better in practice.

Master Problem Solution

The master problem, although dependent on the slave problems, is otherwise unconstrained. Should we have access to the gradient of its objective, we could employ an iterative hill climbing algorithm to solve the complete relaxation, before proceeding to the tightening step. Unfortunately this quantity may not always exist, since the so-called primal function $w_k(\cdot)$ of the k-th slave problem (6.16) may not be always differentiable. Our next result gives a way forward nevertheless.

Result 3. The subdifferential $\partial w_k(\cdot)$ of the k-th slave problem (6.16) has components $$[\partial w_k(\tilde{L})]_m = \sum_{n: c(n)=m} \mu_k^{n*}, m = 1, \ldots, M \quad (6.1)$$

where $\mu^*_k = [\mu_k^{1*}, \ldots, \mu_k^{N*}]^T$ is the Lagrange multiplier vector associated with the PSD MASK constraint (6.16c) at the optimal solution of the slave.

Proof. Recall that the slave problem is parameterized by the PSD mask $\tilde{L}_k$. Its associated Lagrangian is given by $$L_k(\tilde{P}, \lambda_k, \mu_k; \tilde{L}_k) = \quad (6.18)$$
$$\sum_n \alpha_k^n (\tilde{P}_k^n + \log G_{kk}^n) + \beta_k^n - \lambda_k \left(\sum_n e^{\tilde{P}_k^n} - P_k^{max}\right) - \sum_n \mu_k^n (\tilde{P}_k^n - \tilde{L}_k^{c(n)})$$

where $\lambda_k$ and $\mu_k$ are Lagrangian multiplier and vectors respectfully associated with the maximum-power (6.16b) and PSD mask (6.16c) constraints.

It follows that the m-th subgradient of $w_k(\cdot)$ at $\tilde{L}_k$ is given by the Lagrange multipliers associated with the term $\tilde{L}_k^m$.

Correspondingly, we can reorder the terms within the Lagrangian (6.18) to reveal $$L_k(\tilde{P}, \lambda_k, \mu_k; \tilde{L}_k) = \sum_n \alpha_k^n (\tilde{P}_k^n + \log G_{kk}^n) + \beta_k^n -$$
$$\lambda_k \left(\sum_n e^{\tilde{P}_k^n} - P_k^{max}\right) - \sum_m \tilde{L}_k^m \left(\sum_{n: c(n)=m} \mu_k^n\right) - \sum_n \mu_k^n \tilde{P}_k^n,$$

and the result immediately follows from the final parenthesis.

Result 6.3 implies that we can make use of the following subgradient ascent $$\tilde{L}_k^{m(s+1)} = \tilde{L}_k^{m(s)} + \epsilon^{(s)} \xi_k^m(\tilde{L}^{(s)}, \mu_k^{(s)}),$$

or alternatively in the untransformed space $$L_k^{m(s+1)} = L_k^{m(s)} \exp(\epsilon^{(s)} \xi_k^m(\tilde{L}^{(s)}, \mu_k^{(s)})) \quad (6.19)$$

to solve the master problem, where $\epsilon^{(s)}$ is a step-size at (sub) iteration s and the m-th subgradient $\xi_k^m$ depends on the optimum Lagrange multipliers $\mu$ associated with its respective slave problem. For this iteration to converge to the optimum solution of the relaxation (6.14), we require an infinitely long step-size sequence $\{\epsilon^{(s)}\}_{s=1}^{\infty}$ that satisfies $$\lim_{s \to \infty} \epsilon^{(s)} = 0 \text{ and } \sum_{s=1}^{\infty} \varepsilon^{(s)} = \infty.$$

Such a sequence is not entirely practical, as the diminishing step-size slows convergence. As pointed out earlier, we need only an improved objective in practice, before proceeding to the tightening step. We therefore advocate the use of a fixed step-size.

We now combine the above subgradient with the partial derivative of the second term within the objective (6.15). After simplification, the following subgradient results:

$$\xi_k^m(\tilde{L}, \mu) = \sum_{n: c(n)=m} \left\{ \omega_k \mu_k^n - L_k^m \sum_{j \neq k} \omega_j \alpha_j^n \frac{SWIR_j^n(P_j^n, L_{-j})}{G_{jj}^n P_j^n} G_{jk}^n \right\} \quad (6.20)$$

$$= \sum_{n: c(n)=m} \left\{ \omega_k \mu_k^n - L_k^m \sum_{j \neq k} \frac{\omega_j \alpha_j^n}{\sum_{u \neq j} G_{ju}^n L_u^m + \sigma_j^n} G_{jk}^n \right\}.$$

It is independent of P can be used to compute the master iteration (6.19).

The subsequent band level update for a particular user k has a meaningful interpretation. The inner summation comprises worst-case interference levels from all other users, weighted by the crosstalk gain $G''_{jk}$. This gain ensures band levels for user k are chosen so that they take into consideration the impact of the noise injected into other users $j \neq k$—in stark contrast to the selfish nature of IWF and more like the PSD updates of SCALE. Moreover, the priority-weights $\{\omega_i\}_{i=1}^K$ of all users are incorporated—a difficult notion to capture effectively with IWF.

It might appear that all tones within a particular band carry equal weight toward the computation of the corresponding band level, however this is subtly not the case. Each band level is altered when the overall impact had on other users is balanced appropriately against the Lagrange multipliers µ resulting from the slave solutions. These multipliers have a sensitivity interpretation: each $\mu_k^n$ gives an indication of the rate of change of the k-th user's data-rate resulting from a change in the bandlevel $L_k^{c(n)}$ associated with tone n (ref. [11, Sec. 3.2.3]). Tones that have a larger impact on a user's data-rate would have a higher multiplier value, and in turn, greater influence on the associated band level.

Like SCAPE, some developments also factor in the contributions of all tones n within each band, albeit only a simple average of the crosstalk gain $G''_{jk}$ to direct-channel gain $G''_{kk}$ ratios. A thresholding rule then selects the band having worst-case ratio (wherein a nonzero power allocation is also made) and the corresponding level is updated with a quantum, repeated until the associated IWF performance no-longer improves. In some sense, that method is an extremely coarse view of the subgradient step made in the SCAPE update (6.19), where in our method, we are able to incorporate a rich set of tonal information (channels, band levels and power allocation via multipliers µ) to undertake a band level adjustment directly. We can do this since our developments are based on an optimization framework, where we have the additional ability to incorporate other requirements—such as user priority-weights—with systematic ease.

Slave Problem Solution

The k-th slave problem is equivalent to the convex optimization problem $$\max_{\{0 \leq P_k^n \leq L_k^{c(n)}, \forall n\}} \sum_n \alpha_k^n \log P_k^n + \beta_k^n \quad (6.21)$$

$$\text{s.t.} \sum_n P_k^n \leq P_k^{\max},$$

where the logarithmic transformations have been unravelled and we have recognize the PSD mask constraint is simply a box-constraint on the PSD. By equivalent, we mean that an optimal solution to this problem is also an optimal solution to the slave (6.16).

The above optimization is exactly the relaxed form of water-filling. If we were to ignore the PSD mask, the RA-SCAWF algorithm provides the basis for a closed-form solution. We now remind the reader of our previous developments—derivation of the SCAWF algorithm that incorporates the PSD masks—resulting in an efficient iterative solution to each slave problem.

We proceed by formulating an appropriate Lagrangian dual problem, with a single multiplier $\delta_k$ associated with the maximum power constraint. It is straightforward to show that the following solution results:

$$\delta_k^{(s+1)} = \left[ \delta_k^{(s)} + \varepsilon_\delta \left\{ \sum_n P_k^{n(s)} - P_k^{\max} \right\} \right]^+ \quad (6.22a)$$

$$P_k^{n(s+1)} = \min\left\{ L_k^{c(n)}, \frac{\alpha_k^n}{\delta_k^{(s)}} \right\}, \quad (6.22b)$$

where s is an iteration counter and $\epsilon_\delta$ is a sufficiently small step-size; both are for notational purposes only (not required in practice).

Substituting (6.22) into (6.22a) reveals the simple form of the Lagrangian dual problem: a one-dimensional search for $\delta^*_k$. At equilibrium, we have $$\sum_n \min\left\{ L_k^{c(n)}, \frac{\alpha_k^n}{\delta_k^*} \right\} = P_k^{ma}$$

or equivalently, $$\sum_{n \in CLP_k} L_k^{c(n)} + \sum_{n \notin CLP_k} \frac{\alpha_k^n}{\delta_k^*} = P_k^{\max} \quad (6.23)$$

where we have defined the set $CLP_k \triangleq \{n : P_k^{n*} = L_k^{c(n)}\}$ that represents the indices of all tones that are clipped to the PSD mask at the optimal solution $\{P^*_k, \delta^*_k\}$. Condition (6.23) is most convenient: should the set CLPk be known, we can compute the solution to the dual problem by rearranging (6.23) to compute the optimum multiplier $$\delta_k^* = \frac{\sum_{n \notin CLP_k} \alpha_k^n}{P_k^{\max} - \sum_{n \in CLP_k} L_k^{c(n)}}, \quad (6.24)$$

and subsequently, the power allocation by substitution into (6.22b), $$P_k^{n*} = \begin{cases} L_k^{c(n)}, & n \in CLP_k \\ \left(P_k^{\max} - \sum_{n \in CLP_k} L_k^{c(n)}\right) \frac{\alpha_k^n}{\sum_{m \notin CLP_k} \alpha_k^m}, & \text{otherwise.} \end{cases} \quad (6.25)$$

We will make use of (6.25) to find the set $CLP_k$ iteratively: starting with $CLP_k$ we evaluate (6.25) to find a candidate power-allocation. Should any of the resulting powers violate their respective PSD constraint, the associated tone indices are added to the set $CLP_k$ and the current PSD is not yet optimal. This process is repeated until none of the allocated powers exceed the PSD mask; the condition (6.25) is then satisfied and the resulting power-allocation $P_k$ is indeed optimal and solves the slave problem.

Mapping of Lagrange Multipliers

Although our developments have produced a simple and efficient algorithm to solve the slave, it does not produce the required Lagrange multipliers $\mu^*_k$ needed to solve the master problem. Fortunately the optimal PSD $P^*_k$ obtained from the above procedure can be used to reverse-engineer these values. This is possible because $P^*_k$ is also optimal for the slave (6.16), by its equivalence to (6.21). To do so, we will make use of the necessary KKT conditions that any optimum solution to the convex slave problem (6.16) must satisfy.

The KKT condition $$\frac{\partial L_k}{\partial P_k^n} = 0 = \alpha_k^n - \lambda_k^* P_k^{n*} - \mu_k^{n*} \quad (6.26)$$

follows the stationary point of the Lagrangian (6.18) associated with the slave (6.16).

Consider a PSD $P^*_k$ resulting from the above procedure. We remind the reader that it is both feasible and optimal for the slave (6.16). One of the following situations applies:

1. All tones that are allocated nonzero powers are clipped to their respective maximum level. Mathematically, this corresponds to the condition $CLPk=\{n: P_k^n>0\}$. In this case, the maximum power constraint (6.16b) does not come into play (by feasibility of the PSD $P^*_k$) and we can take $\lambda^*_k=0$. It then follows from (6.26) that $$\mu_k^{n*} = \alpha_k^n, n=1, \ldots, N. \quad (6.27)$$

2. The maximum-power constraint is active. At least one of the PSD constraints (6.16c) must then be inactive. It follows that $\mu^{m*}_k=0$ for at least one tone m. The tone index m can easily be found with a single-pass search of the PSD $P^*_k$, allowing us to compute $\lambda^*_k \alpha^m_k / P^{m*}_k$. This value can then be used to retrieve all multipliers by way of (6.26):

$$\mu_k^{n*} = \alpha_k^n - \lambda_k^* P_k^{n*} \quad (6.28)$$

$$= \alpha_k^n - \alpha_k^m \frac{P_k^{n*}}{P_k^{m*}}, n = 1, \ldots, N.$$

Solution Summary

We now summarize the results of this section. The SCAPE algorithm begins by initializing approximation vectors to the so-called high-SWIR approximation, where all $\alpha^n_k=1$ and $\beta^n_k=0$. Initial PSD masks are set to the noise level, where all $L_k^{c(n)}=\sigma^n_k$ A solution to the associated two-level relaxation (6.15)-(6.16) is then computed. This is done by fixing all PSD masks L, then feeding each individual mask $L_k$ to one of the corresponding K slaves. In isolation, each slave $k \in [1,K]$ computes a relaxed water-filling solution $P^*_k$ under its respective mask. This is achieved by repeated computation of PSD update (6.25) in unison with a clip set $CLP_k$ update until the feasible solution $P^*_k$ is found. This solution is used to find the associated multipliers $\mu^*_k$ with (6.27) or (6.28).

Having computed multipliers $\mu=[\mu^*_1, \mu^*_2, \ldots, \mu^*_K]$ associated with all slaves, subgradients are computed by the master with (6.20) and are subsequently used to update all PSD masks L with the update (6.19).

The process just described is repeated until the PSD mask levels converge to within a suitable tolerance, or a prescribed number of repetitions $D \geq 1$ are completed. At this point, a tightening operation can be performed to update the approximation vectors with (6.12) and the entire process repeated over again, until these vectors also converge.

Performance

In this section, we evaluate the performance of IWF under a SCAPE mask design and continuous bit-loading. Performance comparisons are made against SCALE and IWF without spectral masks. Our evaluations consider the DSL network topology for consistency, that is, VDSL over 26-AWG (0.4 mm) lines with a coding gain of 3 dB and 6 dB noise margin. ASNR-gap $\Gamma^n_k=12.8$ dB results, associated with an error probability of $10^{-7}$. Each modem has maximum transmission power 11.5 dBm, and can transmit in both 1U and 2U upstream bands (regional-specific band; former plan 998) with amateur RF bands notched off. A DMT symbol rate of 4 kHz is assumed, with tone spacing of 4.3125 kHz. Users are subject to −140 dBm/Hz background noise and alien noises corresponding to ETSI models XA.{L,N}T.{A,D} as appropriate. The cross-gains $G_{ij}^n$ are calculated without FSAN combination of FEXT sources, and using standard FEXT models. (See FIG. 7)

We consider K=8 users, split into two equal groups of 4 users. The downstream topology of has a central office (CO)-based group with 3 km loop lengths. A remote terminal (RT) deployment is placed 2 km from the CO, with a RT-based user-group further along, having 2 km loop lengths. The upstream topology has the two user-groups connected to a single CO, having loop lengths of 0.5 km and 1.5 km respectively.

We consider K=8 users, split into two equal groups of 4 users. The downstream topology of has a central office (CO)-based group with 3 km loop lengths. A remote terminal (RT) deployment is placed 2 km from the CO, with a RT-based user-group further along, having 2 km loop lengths. The upstream topology has the two user-groups connected to a single CO, having loop lengths of 0.5 km and 1.5 km respectively.

Figure 7:
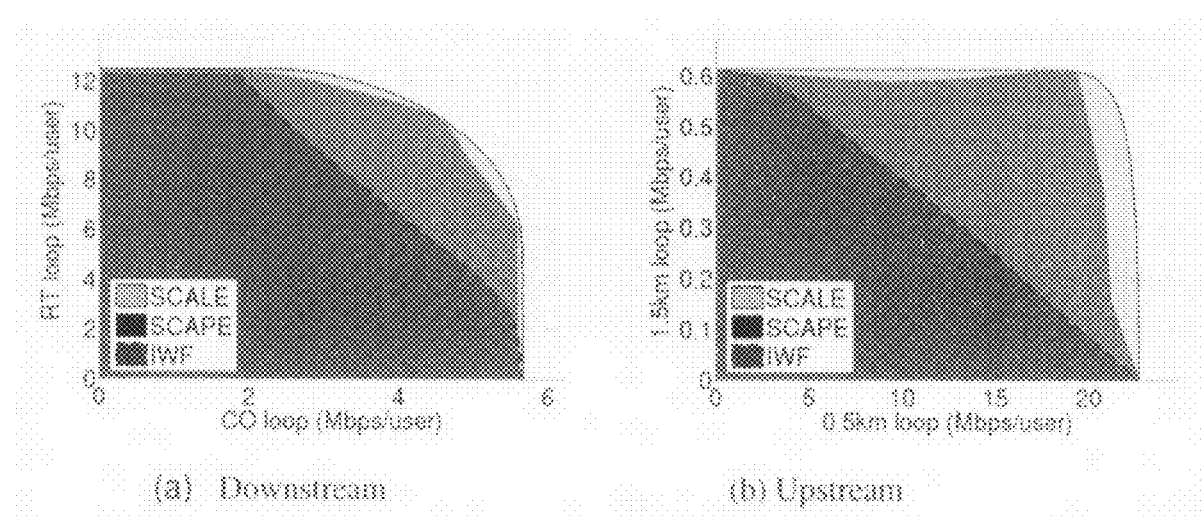
FIG. 7 is a comparative diagram of the result of the method of distributed spectrum management of digital communication systems in accordance with the invention in relation to SCALE and IWF by showing rate-regions associated with two users, one from each user-group.

All results surrounding SCAPE are obtained by first designing appropriate masks using the disclosed developments, then running IWF under these masks as a final step. Due to the inherent symmetry in the channel models, the resulting rates for users having equal loop lengths end up the same. FIG. 7 then shows the rate-region between two users, one from each user-group. We clearly see that the performance of IWF can be significantly enhanced by a SCAPE mask design. The SCAPE rate-regions are computed with M=3 bands for the downstream and M=20 for the upstream direction. We further discuss the reasons for this particular selection below.

Figure 8:
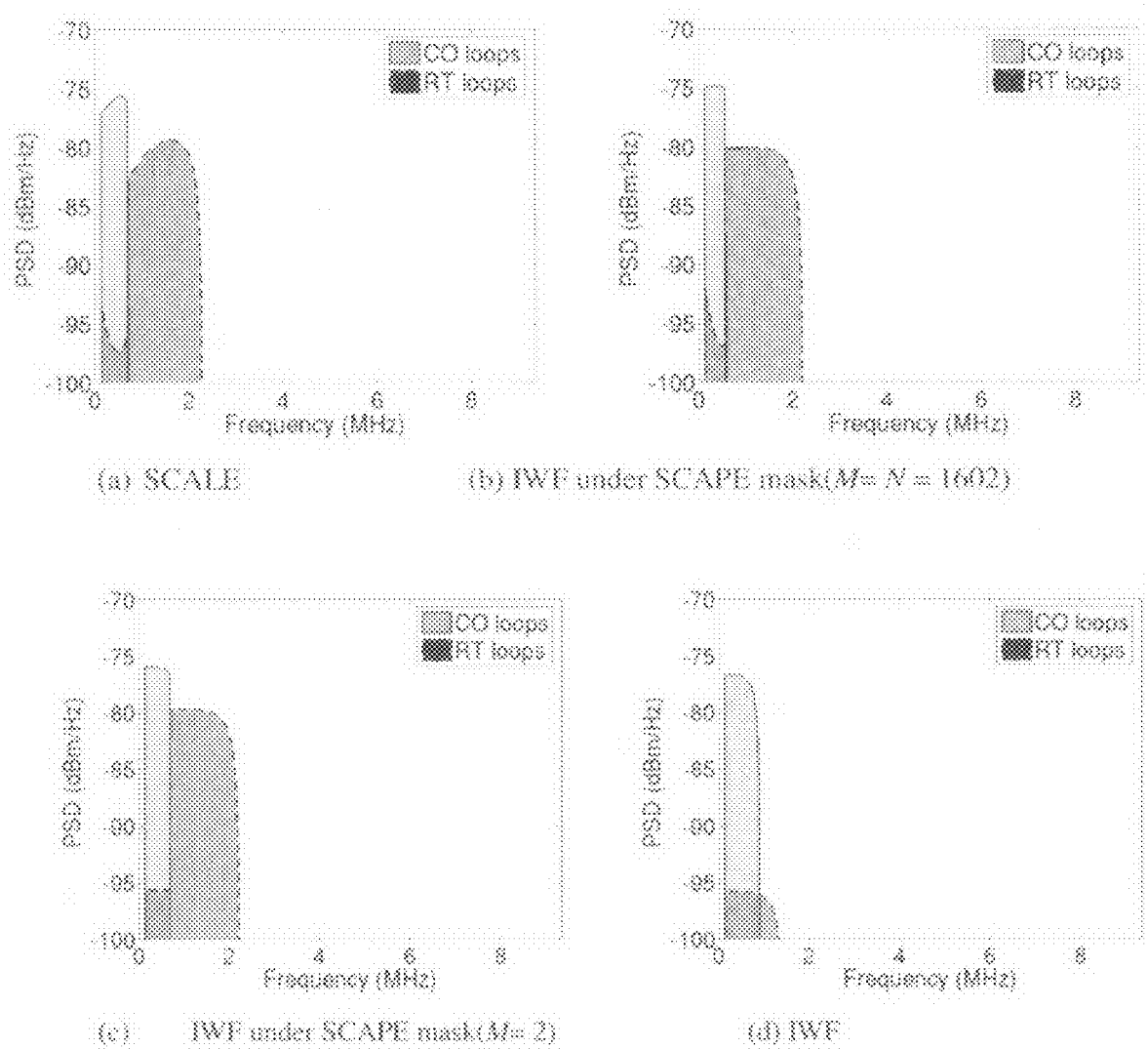
FIG. 8 is a comparative diagram of the result of the method of distributed spectrum management of digital communication systems in accordance with the invention in relation to SCALE and IWF by showing a downstream comparison of PSDs arising from SCALE, SCAPE and IWF

We now select specific points within the rate-region in order to compare the algorithms in more detail. For the downstream, our selection corresponds to a 4 Mbps/user service on CO-based loops. FIG. 8 shows the resulting PSDs for each user. Of these results, SCALE provides the greatest total network rate of 61.674 Mbps. Without masks, IWF achieves a total network rate of just 42.412 Mbps. Making use of M=N bands, SCAPE improves this to 61.453 Mbps—very close to the SCALE result. (See FIG. 8)

While the respective PSDs in FIGS. 8a and 8b have similar form, they are not exactly the same. In particular, we observe that the PSDs produced by SCALE have an increasing trend before the peak, whereas the PSDs resulting from SCAPE are largely flat over the spectrum where the majority of power is allocated. We emphasize that there is little disagreement between the total network rates, despite these visible differences. This observation allows us to drastically reduce the number of bands to just M=2 without any discernible sacrifice in total network rate. FIG. 8c shows the associated PSD, where the network rate is 61.422 Mbps—only marginally less than with the case with unity band-sizes. These results are important, as they validate the worst-case lower bound optimization framework upon which SCAPE hinges.

We stress that this result was only possible by an appropriate design of the two bands. In this case, the first band spans the lower frequencies until approximately 600 kHz, where the division of CO-and RT-based users occurs in the SCALE result (and also the unity band-size SCAPE result of FIG. 8b). The second band spans all other higher frequencies. It turns out that the location of this "cross-over point" changes with the user priority-weights ω and is precisely why M=3 bands are used to produce the rate-region of FIG. 7a. We include a third band, placed in between the two already described, to cater for any slight variation in the location of the cross-over point as the value ω is swept to create the rate-region.

In general, it may be unclear how the pattern should be designed. Should we wish to minimize the number of bands utilized, we could construct another optimization problem to guide our selection, although in this case, its implementation may be prohibitively expensive due to its discrete nature. We therefore suggest the following simple heuristic. First compute a SCALE (or SCAPE with M=N bands) solution, then devise a band pattern that would best quantize the shape of the PSD, taking careful note of regions where a cross-over between user PSDs occur—as illustrated in the example above. Where such PSDs have an overly complex shape or form, it may be best to just make use of a liberal number of equally-spaced bands. This turns out to be a good approach for the upstream scenario, as we next illustrate.

Figure 9:
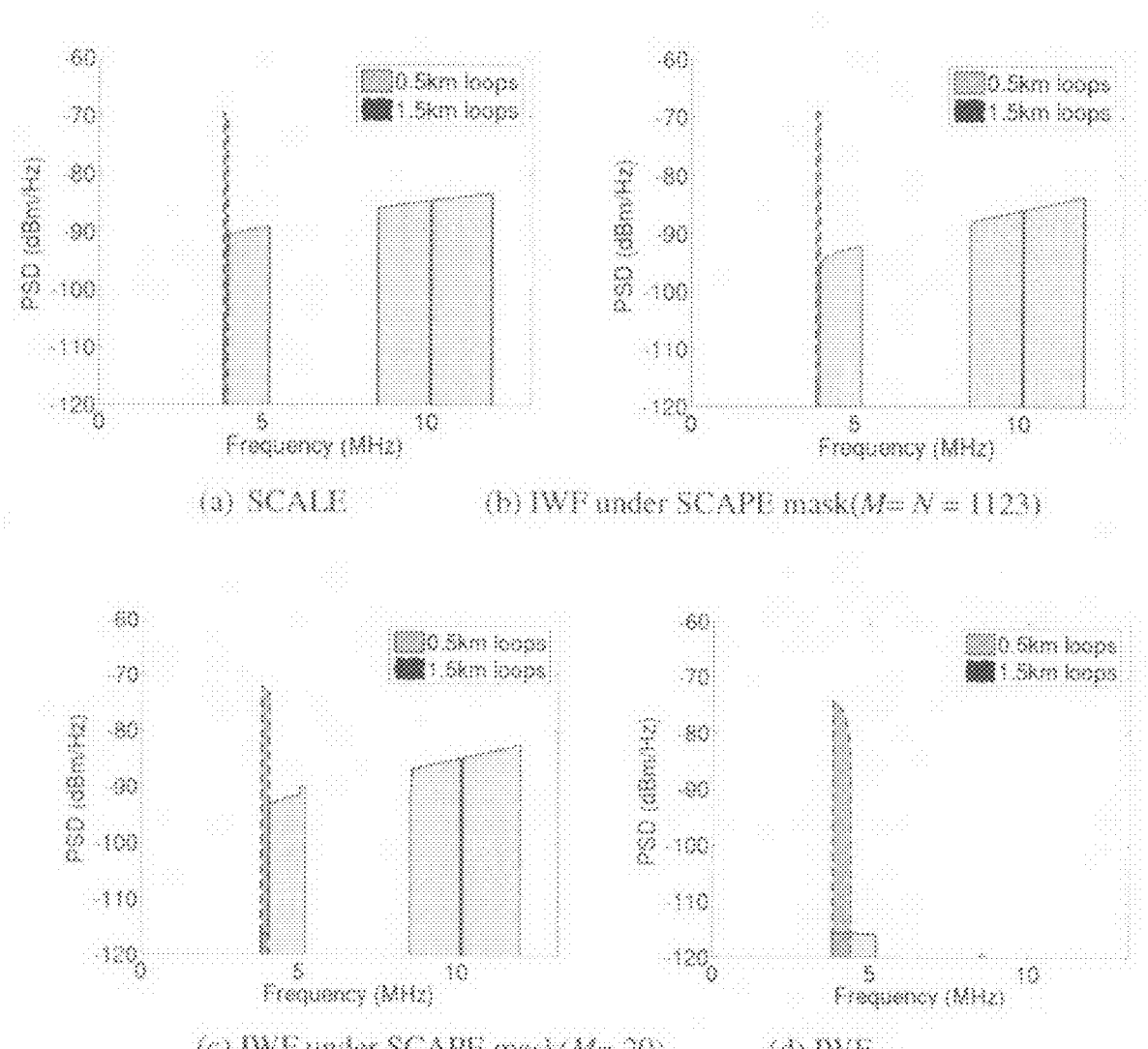
FIG. 9 is a comparative diagram of the result of the method of distributed spectrum management of digital communication systems in accordance with the invention in relation to SCALE and IWF by showing an upstream comparison of PSDs arising from SCALE, SCAPE and IWF

Our selection from the upstream rate-region corresponds to a 500 kbps/user service on 1.5 km loops. FIG. 9 shows the resulting PSDs. SCALE again performs best, with a total network rate of 91.054 Mbps. Without masks, IWF performs poorly with a total rate of just 25.417 Mbps. SCAPE again improves the situation dramatically to achieve a network rate of 90.511 Mbps utilizing a full set of bands M=N. The respective PSDs in FIGS. 9a and 9b are very nearly the same.

Observe that these PSDs have increasing density at the higher frequencies on the shorter loops. Standard IWF fails to pour any power into this region (see FIG. 9d) since the channel gains are small in comparison with those at lower frequencies and, by its very nature, IWF allocates power into the best available channels first. This behaviour contributes greatly to the poor performance of IWF, as compared to the SCALE solution where the power allocation instead amplifies in density with increasing frequency. To induce IWF into allocating such an "unnatural" PSD shape, we require a large number of bands, as compared to the downstream scenario described above.

With M=20 bands, we can preserve this increasing density at the higher frequencies, where we observe a "stair-case effect" associated with the 0.5 km loops around 10 MHz in FIG. 9c. The total network rate of 90.084 Mbps that results is only marginally smaller than what is obtained with unity band-sizes.

It can therefore be seen that band preference has the potential to significantly improve the performance of current-day DSL networks that make use of water-filling, for example, those that are based on the ADSL2 and VDSL standards. Performance gains are realized by taming the selfish nature of IWF through a PSD mask constraint, which is typically clustered into a number of bands for historical reasons of implementation complexity. These masks are passed to each modem from a central SMC at initialization, with further updates possible on a periodic basis should line conditions change significantly.

In general, the design of a suitable PSD mask is not easy. Analysis is made difficult by the IWF procedure that couples all users together. Nevertheless, trivial solutions were shown to exist and a characterization given. For the special-case of unity band-sizes, it was shown that the PSDs resulting from the associated spectrum balancing problem—computed with the SCALE algorithm for example—map directly onto mask values. These masks induced the IWF procedure into producing the desired PSDs exactly and, in that special-case, subsequently rendered it superfluous, as the result was already known.

For the general-case, a novel optimization framework is proposed that decouples IWF users through a worst-case design. Unlike an existing scheme based on ad-hoc methods, our formulation provided a systematic approach to band design that had the additional advantage of incorporating other requirements—such as user priority-weights—with ease. This formulation was also shown to be a natural one, particularizing to the spectrum balancing result in the special-case of unity band-sizes. Although our framework provided a straightforward path for analysis, the resulting problem was shown to be nonconvex and NP-hard.

Our proposed solution, named SCAPE, exploited underlying convexities to relax the framework into a sequence of convex approximations. The sequence was noted to always converge, doing so to a KKT-point that satisfies the necessary condition for optimality. A low-complexity implementation was provided, based on a two-level primal decomposition. In the true spirit of BP, a master problem determined the band levels in direct response to the outcome of a number of independent slave problems that each under took a relaxed water-filling operation.

Numerical studies were shown to validate our worst-case design approach, with SCAPE observed to improve IWF performance to levels that approached that of SCALE. This was demonstrated with as few as two bands in the downstream direction, made possible by a judicious design of the band pattern. On the other hand, a tenfold increase in the number of bands was required in the upstream topology to achieve near-optimal performance. These drastic differences in the band pattern were noted to depend on the shape of the PSDs resulting from spectrum balancing, where a good band pattern was effective in retaining a similar shape after IWF.

It should be understood that the above description is of a preferred embodiment and included as illustration only. It is not limiting of the invention. Clearly variations of the method of distributed spectrum management of digital communication systems would be understood by a person skilled in the art without any inventiveness and such variations are included within the scope of this invention as defined in the following claims.

The invention claimed is:

1. A method of determining a spectrum management of a digital communication systems having a plurality of communication lines on which signals are transmitted and received with interference by respective users, the method comprising the steps of:
   a. determining a model of a defined digital communication system with each communication line having a predetermined number and width of bands for each user's spectrum;
   b. assessing the power levels within each band, for each user, assuming a predetermined maximum interference from other users;
   c. undertaking an iterative feedback of assessment of each band of each user to reassess the power levels within each band to a predefined optimised level and modifying the model of the defined digital communication system;
   wherein the method provides an output having defined assessed optimised levels for each band of at least a portion of the communication lines of the defined digital communication system.

2. The method of claim 1 wherein the predefined optimised level is determined by a predefined number of iterations.

3. The method of claim 1 wherein the predefined optimised level is determined by a predefined accuracy.

4. The method of claim 1 wherein the predetermined maximum interference is determined by an expected interference at a maximum power level.

5. A method for spectrum management of digital a communication systems having a plurality of communication lines on which signals are transmitted and received by respective users, the method comprising the steps of:
   a. receiving information about line, signal and interference characteristics of a plurality of the communication lines from a plurality of sources;
   b. determining each user's power spectrum categorised into a number of bands;
   c. determining constraints on power allocation of particular plurality of the communication lines for each band of each user's power spectrum by:
      5. determining a model based on a predetermined number and width of bands for each user's spectrum;
      ii. assessing the power levels within each band, for each user, assuming a predetermined maximum interference from other users; and
      iii. undertaking an iterative feedback of each band of each user to reassess the power levels within each band to a predefined optimised level;
   d. placing constraints on power allocation of particular plurality of the communication lines between respective transmitter and receiver taking into consideration the determined line, signal and interference characteristics of a plurality of the communication lines and consideration of the determined constraints on power allocation of the communication lines to allow required effective data-rates for each of said respective users to be satisfied.

6. The method of claim 5 wherein the step of undertaking an iterative feedback of each band of each user to reassess the power levels within each band to a predefined optimised level includes modifying the model of the defined digital communication system.

7. The method of claim 5 wherein the determining of the constraints uses decoupling of the iterative water filling.

8. The method of claim 5 wherein the determining of the constraints uses optimisation techniques.

9. The method of claim 5 wherein the determining of the constraints is determined by making use of a solution to the following optimization:

$$\max_{P, L \geq 0} \sum_k \omega_k \overset{\vee}{R}_k^{WC}(P_k, L_{-k}; \alpha_k, \beta_k)$$

$$\text{s.t.} \sum_n P_k^n \leq P_k^{\max}, \forall k,$$

$$P_k^n \leq L_k^{c(n)}, \forall k, n.$$

10. The method of claim 9 wherein the determining of the constraints uses a two-level primal decomposition whereby a master is responsible for band management, based on a relaxed water-filling result of a number of independent slaves and the slaves are responsible for obtaining power levels for each band associated with each user.

11. The method of claim 10 wherein the determining of the master problem $$\xi_k^m(\tilde{L}, \mu) = \sum_{n:\, c(n)=m} \left\{ \omega_m \mu_k^n - L_k^m \sum_{j \neq k} \omega_j \alpha_j^n \frac{SWIR_j^n(P_j^n, L_{-j})}{G_{jj}^n P_j^n} G_{jk}^n \right\}$$

$$= \sum_{n:\, c(n)=m} \left\{ \omega_k \mu_k^n - L_k^m \sum_{j \neq k} \frac{\omega_j \alpha_j^n}{\sum_{j \neq k} G_{ju}^n L_u^m + \sigma_j^n} G_{jk}^n \right\}$$

the band level alterations determined by $$\tilde{L}_k^{m(s+1)} = \tilde{L}_k^{m(s)} + \epsilon^{(s)} \xi_k^m(\tilde{L}^{(s)}, \mu_k^{(s)}),$$

or alternatively in the untransformed space $$L_k^{m(s+1)} = L_k^{L\, m(s)} \exp(\epsilon^{(s)} \xi_k^m(\tilde{L}^{(s)}, \mu_k^{(s)}))$$

where $\epsilon^{(s)}$ is a step-size at (sub)iteration s and the m-th subgradient $\xi_k^m$ depends on the optimum Lagrange multipliers $\mu$ associated with its respective slave problem.

12. The method of claim 10 wherein the determining of the slave problem to determine power level for each band of each user uses:

$$\max_{\{0 \leq P_k^n \leq L_k^{c(n)}, \forall n\}} \sum_n \alpha_k^n \log P_k^n + \beta_k^n$$

$$\text{s.t.} \sum_n P_k^n \leq P_k^{\max},$$

and with feedback from optimisation techniques.

13. The method of claim 5 wherein the digital communication system is a DSL system.

14. The method of claim 5 wherein the communication lines is based on ADSL2 or VDSL.

15. The method of claim 5 wherein the step of placing constraints on power allocation of particular plurality of the communication lines includes sending a mask value of determined constraints to a modem to alter its power allocation on the communication lines in one or more of said bands of one or more users.

16. The method of claim 5 wherein the step of placing constraints on power allocation of a particular plurality of the communication lines includes sending per-tone bit-loading limits to a modem to alter power allocation on the communication lines in one or more of said bands of one or more users.

17. The method of claim 5 wherein the step of collecting information about line, signal and interference characteristics of the communication lines and iterative feedback from a plurality of sources is coordinated by a spectrum management centre.

18. The method of claim 5 wherein the step of placing constraints on power allocation of particular plurality of the communication lines includes placing a predetermined weighting of power level on one or more user's lines.

19. The method of claim 5 wherein the step of placing constraints on power allocation of particular plurality of the communication lines includes the process of:

---

1: Initialize all $\alpha_k^{(0)} = 1$, $\beta_k^{(0)} = 0$ (a high-SWIR approximation)
2: Initialize all PSDs $P_k^{(0)} = 0$
3: Initialize all PSD masks to the noise level $L_k^{(0)} = [\sigma_k^1, \sigma_k^2, \ldots, \sigma_k^N]$
4: Initialize iteration counter $t = 1$
5: repeat 6: Maximize: solve relaxation:

$$\max_{P, L \geq 0} \sum_k \omega_k \check{R}_k^{WC}(P_k, L_{-k}; \alpha_k, \beta_k)$$

$$\text{s.t.} \sum_n^k P_k^n \leq P_k^{max}, \forall\, k,$$

$$P_k^n \leq L_k^{c(n)}, \forall k, n.$$

to give solution $\{P^{(t)}, L^{(t)} = 0\}$
7: Tighten: update elements of $\alpha_k^{(t+1)}, \beta_k^{(t+1)}$ using $$\alpha = \frac{z_0}{1+z_0} \text{ and } \beta = \log(1+z_0) - \frac{z_0}{1+z_0}\log z_0$$

at $z_0 = \text{SWIR}_k^n(P_k^{n(t)}, L_{-k}^{(t)})$
8: Increment t
9: until convergence.

---

20. The method of claim 5 wherein the power allocation determination is translated into one or more spectral masks that are consequently sent to a particular plurality of the communication lines and where the step of varying power allocation of said communication lines is then locally determined, where the power is locally controlled by the particular plurality of the communication lines to be the required level if less than the level indicated by the said spectral mask or is the allocated maximum power level indicated by the said spectral mask.

* * * * *

UNITED STATES PATENT AND TRADEMARK OFFICE
CERTIFICATE OF CORRECTION

PATENT NO.         : 7,864,697 B2
APPLICATION NO.    : 11/890144
DATED              : January 4, 2011
INVENTOR(S)        : Papandriopoulos et al.

It is certified that error appears in the above-identified patent and that said Letters Patent is hereby corrected as shown below:

In Column 2, Line 24, delete "preceding." and insert -- precoding. --, therefor.

In Column 13, Line 59, delete "$\Gamma k^n_{k,}$" and insert -- $\Gamma^n_{k,}$ --, therefor.

In Column 20, Line 20, delete "(6.1)" and insert -- (6.17) --, therefor.

In Column 22, Line 44, delete "(6.22)" and insert -- (6.22b) --, therefor.

In Column 24, Line 41, delete "$\Gamma^n_k$" and insert -- $\Gamma^n_k$ --, therefor.

In Column 27, Line 56, in Claim 5, delete "5." and insert -- i. --, therefor.

In Column 28, Line 34, in Claim 11, delete "problem" and insert -- problem uses: --, therefor.

In Column 28, Lines 40-44, in Equation, in Claim 11, delete "$= \sum_{n:\, c(n)=m} \left\{ \omega_k \mu^n_k - L^m_k \sum_{j \neq k} \frac{\omega_j \alpha^n_j}{\sum_{j \neq k} G^n_{ju} L^m_u + \sigma^n_j} G^n_{jk} \right\}$" and insert -- $= \sum_{n:\, c(n)=m} \left\{ \omega_k \mu^n_k - L^m_k \sum_{j \neq k} \frac{\omega_j \alpha^n_j}{\sum_{u \neq j} G^n_{ju} L^m_u + \sigma^n_j} G^n_{jk} \right\},$ --, therefor.

Signed and Sealed this
Fourth Day of October, 2011

David J. Kappos
*Director of the United States Patent and Trademark Office*